(12) United States Patent
Ogawa et al.

(10) Patent No.: US 11,543,574 B2
(45) Date of Patent: Jan. 3, 2023

(54) WAVE PLATE, METHOD FOR MANUFACTURING WAVE PLATE, AND OPTICAL APPARATUS

(71) Applicant: THE JAPAN STEEL WORKS, LTD., Tokyo (JP)

(72) Inventors: Kengo Ogawa, Tokyo (JP); Shinya Yamada, Tokyo (JP); Hiroaki Yokota, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 397 days.

(21) Appl. No.: 16/792,877

(22) Filed: Feb. 17, 2020

(65) Prior Publication Data
US 2020/0355861 A1     Nov. 12, 2020

(30) Foreign Application Priority Data
May 9, 2019     (JP) .............................. JP2019-089079

(51) Int. Cl.
*G02B 5/30* (2006.01)
*G02F 1/13363* (2006.01)
*B32B 7/023* (2019.01)

(52) U.S. Cl.
CPC ............ *G02B 5/3083* (2013.01); *B32B 7/023* (2019.01); *G02B 5/305* (2013.01); *G02F 1/133634* (2013.01); *G02F 1/133638* (2021.01)

(58) Field of Classification Search
CPC ................ G02B 5/3083; G02B 27/281; G02F 1/133638; G02F 1/133634; G02F 1/133541; G02F 2413/03; G02F 2413/08
See application file for complete search history.

(56) References Cited

U.S. PATENT DOCUMENTS

2005/0213006 A1*   9/2005   Baek ................... G02F 1/13363
349/114

FOREIGN PATENT DOCUMENTS

| JP | H09-221342 A | 8/1997 |
|---|---|---|
| JP | 2009-122408 A | 6/2009 |
| JP | 5501918 B2 | 5/2014 |
| JP | 2017-177519 A | 10/2017 |

* cited by examiner

*Primary Examiner* — Angela K Davison
(74) *Attorney, Agent, or Firm* — SGPatents PLLC

(57) ABSTRACT

A wave plate 1 according to an embodiment includes a first birefringent substrate 10 including a first main surface and an optical axis 13 in a first direction; a second birefringent substrate 20 disposed over the first birefringent substrate 10 and including a second main surface and an optical axis 23 in a second direction; and a third birefringent substrate 30 disposed over the second birefringent substrate 20 and including a third main surface and an optical axis 33 in a third direction. The first birefringent substrate 10 and the second birefringent substrate 20 are made of the same kind of birefringent material. The first main surface, the second main surface, and the third main surface are disposed in parallel to one another. The first direction and the second direction are parallel to the first main surface and the second main surface.

10 Claims, 18 Drawing Sheets

WAVE PLATE, METHOD FOR MANUFACTURING WAVE PLATE, AND OPTICAL APPARATUS

INCORPORATION BY REFERENCE

This application is based upon and claims the benefit of priority from Japanese patent application No. 2019-089079, filed on May 9, 2019, the disclosure of which is incorporated herein in its entirety by reference.

BACKGROUND

The present disclosure relates to a wave plate, a method for manufacturing a wave plate, and an optical apparatus.

A wave plate is an element for creating a phase difference between an ordinary ray and an extraordinary ray using a difference between a speed of the ordinary ray and that of the extraordinary ray due to birefringence of a birefringent material. Wave plates are used in optical disk apparatuses, liquid crystal displays, liquid crystal projectors, etc.

A birefringent material such as polymer, quartz, mica, and sapphire is used for the wave plate. Examples of the wave plate include a λ/2 wave plate and a λ/4 wave plate, depending on the functions included therein. For example, the λ/2 wave plate converts a plane of polarization of linearly polarized incident light into linearly polarized light rotated by 90[°] The λ/2 wave plate has a function of setting a difference between a phase of an ordinary ray and that of an extraordinary ray to 180[°] ($\pi$), depending on the wavelength band used.

In a liquid crystal projector or the like, an output of a light source is increased for the purpose of improving the quality of images, and a wave plate including a polymer as a material is not used due to a problem of durability and instead inorganic quartz or the like is used.

SUMMARY

When a wave plate is used for an optical apparatus of a liquid crystal projector or an optical pickup, the wave plate may be disposed over a path where light converges in a conical form, due to an arrangement of a light source and a lens system. In this case, a light beam is perpendicularly incident on the wave plate in the vicinity of the center of the light beam and is incident obliquely on the wave plate at an end part of the conical form. Then, an incident angle becomes greater than 0[°]. For this reason, there is a problem that an amount of light is reduced when a wave plate with a large variation in a phase difference with respect to an incident angle is used.

Other problems and novel features will be apparent from the descriptions of the present specification and the attached drawings.

An example aspect is a wave plate including: a first birefringent substrate including a first main surface and an optical axis in a first direction; a second birefringent substrate disposed over the first birefringent substrate and including a second main surface and an optical axis in a second direction; and a third birefringent substrate disposed over the second birefringent substrate and including a third main surface and an optical axis in a third direction. The first birefringent substrate and the second birefringent substrate are made of the same kind of birefringent material. The first main surface, the second main surface, and the third main surface are disposed in parallel to one another. The first direction and the second direction are parallel to the first main surface and the second main surface. The first direction and the second direction are orthogonal to each other. The third direction is orthogonal to the third main surface, and the third direction is orthogonal to the first direction and the second direction.

Another example aspect is a method for manufacturing a wave plate including the steps of: (a) forming a first birefringent substrate in such a way that the first birefringent substrate includes a first main surface and an optical axis in a first direction parallel to the first main surface; (b) forming a second birefringent substrate in such a way that the second birefringent substrate includes a second main surface and an optical axis in a second direction parallel to the second main surface; (c) forming a third birefringent substrate in such a way that the third birefringent substrate includes a third main surface and an optical axis in a third direction orthogonal to the third main surface; (d) disposing the second birefringent substrate over the first birefringent substrate in such a way that the first main surface becomes parallel to the second main surface and the first direction becomes orthogonal to the second direction; and (e) disposing the second birefringent substrate over the third birefringent substrate in such a way that the second main surface becomes parallel to the third main surface and the second direction becomes orthogonal to the third direction.

Still another example aspect is an optical apparatus including a wave plate. The wave plate includes: a first birefringent substrate including a first main surface and an optical axis in a first direction; a second birefringent substrate disposed over the first birefringent substrate and including a second main surface and an optical axis in a second direction; and a third birefringent substrate disposed over the third birefringent substrate and including a third main surface and an optical axis in a second direction. The first and second birefringent substrates are made of the same kind of birefringent material. The first main surface, the second main surface, and the third main surface are disposed parallel to one another. The first direction and the second direction are parallel to the first main surface and the second main surface. The first direction is orthogonal to the second direction. The third direction is orthogonal to the third main surface and is orthogonal to the first direction and the second direction.

According to the above example aspects, a wave plate that can correct an influence due to a shift in an incident angle can be provided.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Figure 1:
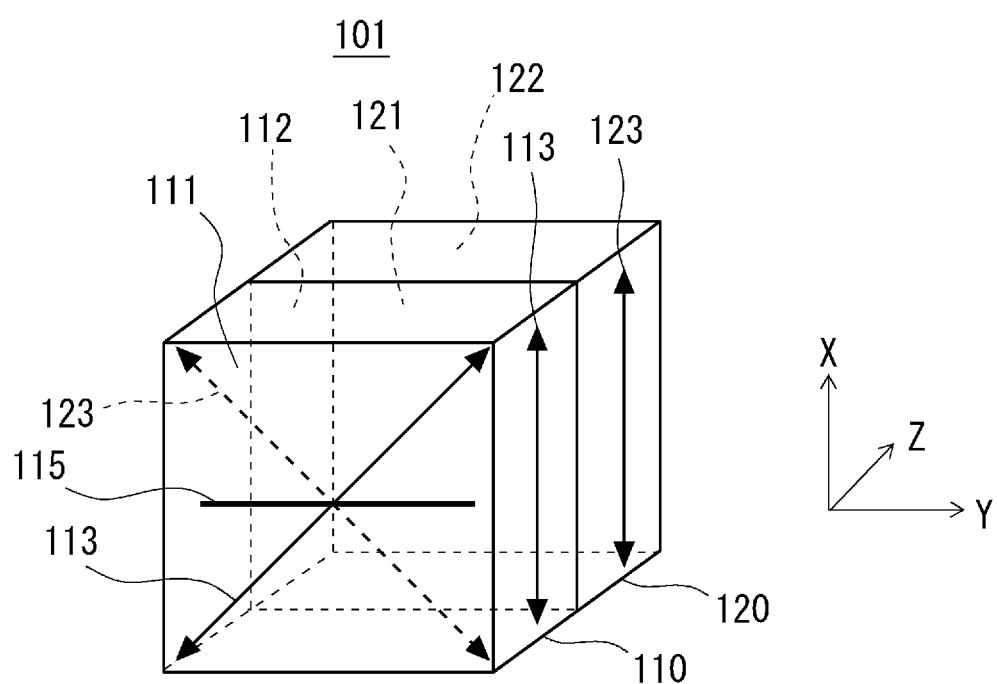
FIG. 1 is a perspective view showing a wave plate according to Comparative Example 1.

The following descriptions and drawings are appropriately omitted and simplified for clarity of explanation. Further, the same elements are denoted by the same reference signs throughout the drawings, and repeated descriptions will be omitted as necessary. In the following descriptions, being parallel and orthogonal respectively mean being parallel and orthogonal within a range that includes an unavoidable error when a wave plate and a birefringent substrate are manufactured. For example, a manufacturing tolerance of ±10 ['] or less is included in this range, and if possible, a manufacturing tolerance of ±5 ['] or less is included in this range. Likewise, the angles 45[°] and 135[°] include manufacturing tolerances similar to the above-described manufacturing tolerances.

First, the types of the wave plate will be described prior to describing a wave plate according to the embodiments. Next, among the types of wave plates, for example, a compound zero-order type wave plate according to Comparative Example 1 and a multi-order type wave plate according to Comparative Example 2 will be described. After that, problems in Comparative Examples 1 and 2 and the principle for solving the problems will be described. Then, the features of the wave plate according to the embodiments will be clarified.

(Types of Wave Plate)

Wave plates are broadly classified into four types: true zero-order type wave plates, multi-order type wave plates, compound zero-order type wave plates, and berek type wave plates. The true zero-order wave plate uses a single sheet of a birefringent material and has a thickness that obtains a predetermined phase difference in the zero-order at a design wavelength. Like the true zero-order type wave plate, the multi-order type wave plate uses a single thick sheet of a birefringent material and has a thickness designed to obtain a predetermined phase difference in a high order. However, due to the increase in the plate thickness, a phase difference shift is likely to occur by a minute shift in a wavelength or a temperature in this type of a wave plate. The compound zero-order wave plate uses two wave plates made of the same material processed into multi-order type wave plates, and the two wave plates are disposed in such a way that optical axes of the respective wave plates become orthogonal to each other. Such an arrangement enables a phase difference shift generated in the wave plates to be cancelled out. Thus, wavelength dependence and temperature dependence of the phase difference obtained by the respective wave plates are reduced.

When a true zero-order type λ/2 wave plate is manufactured using quartz corresponding to light having a center wavelength of 550 nm, a phase difference $\varphi$ can be obtained by $\varphi=2\pi/\lambda \times (n_e-n_0) \times t$. In this formula, an ordinary ray refractive index $n_0=1.544$, an extraordinary ray refractive index $n_e=1.553$, and t is a thickness. The thickness t is calculated by $t=550/2/(1.553-1.544)=30$ [μm]. Polishing or handling quartz having a thickness of 30 [μm] is difficult in terms of strength, and thus quartz having a thickness of 30 [μm] is often bonded to an optical glass or the like as a support substrate to be used.

In order to manufacture a compound zero-order type wave plate, a difference between a thickness of one multi-order type wave plate and that of the other multi-order type wave plate is set to 30 [μm], and these wave plates are bonded to each other in such a way that optical axes of them become orthogonal to each other to be used.

In order to manufacture a wave plate made of quartz, commonly, an X-cut or Y-cut wave plate is used, and an optical axis of the wave plate is orthogonal to a normal line of a substrate. In the berek type wave plate, an angle formed by an optical axis and a normal line of a substrate is shifted from 90 H. By shifting the optical axis, a refractive index of an extraordinary ray is reduced, so that the thickness of a single plate can be such a thickness that makes the wave plate easy to handle.

COMPARATIVE EXAMPLE 1

Next, Comparative Example 1 will be described. FIG. 1 is a perspective view showing an example of a wave plate according to Comparative Example 1. As shown in FIG. 1, a wave plate 101 according to Comparative Example 1 includes a birefringent substrate 110 and a birefringent substrate 120. The wave plate 101 according to Comparative Example 1 is a compound zero-order type wave plate.

The birefringent substrate 110 includes a main surface 111 and a main surface 112 opposite to the main surface 111. The birefringent substrate 110 has, for example, a plate shape in which the main surface 111 and the main surface 112 are parallel to each other. The plate thickness of the birefringent substrate 110 is, for example, 0.330 [mm], but the plate thickness is not limited to this. The birefringent substrate 110 includes a birefringent material. The birefringent substrate 110 contains, for example, quartz as a material. The birefringent material of the birefringent substrate 110 may be magnesium fluoride ($MgF_2$), yttrium vanadate ($YVO_4$), lithium tantalate (LT), sapphire, calcite, lithium niobate (LN), in addition to quartz.

Here, in order to describe each component of the wave plate 101, an XYZ orthogonal coordinate axis system is introduced. A thickness direction of the birefringent substrate 110 is defined as a Z direction, and a plane parallel to the main surface 111 is defined as an XY plane.

The birefringent substrate 110 includes an optical axis 113. The optical axis 113 commonly refers to an axial direction of incident light where the ordinary ray refractive index no matches the extraordinary ray refractive index $n_e$ in the birefringent material. The direction of the optical axis 113 is parallel to, for example, the main surface 111. That is, the optical axis 113 is a predetermined direction in the XY plane parallel to the main surface 111. For example, when a rotation direction in which a right-hand screw advances in the +Z axis direction is used as a reference, the direction of the optical axis 113 is a direction that forms an angle of 45[°] with the +X axis.

A direction orthogonal to the optical axis 113 is a normal line of the main surface 111 and the main surface 112. Commonly, cutting a birefringent material so that the direction orthogonal to the optical axis 113 becomes a normal line is referred to as an X-cut or a Y-cut. The birefringent substrate 110 is a substrate in which the main surface 111 and the main surface 112 are the X-cut or Y-cut.

A birefringent material in which propagation of light in the direction of the optical axis 113 is slower than propagation of light in a direction orthogonal to the optical axis 113, i.e., a birefringent material in which the extraordinary ray refractive index $n_e$ is greater than the ordinary ray refractive index no, is referred to as a positive birefringent material. A birefringent material having one optical axis is referred to as a uniaxial birefringent material. The positive uniaxial birefringent material is, for example, magnesium fluoride ($MgF_2$), yttrium vanadate ($YVO_4$), lithium tantalate (LT), and quartz. A birefringent material in which propagation of light in the direction of the optical axis 113 is faster than propagation of light in a direction orthogonal to the optical axis 113, i.e., a birefringent material in which the extraordinary ray refractive index $n_e$ is smaller than the ordinary ray refractive index no, is referred to as a negative birefringent material. The negative uniaxial birefringent material is, for example, sapphire, calcite, lithium niobate (LN). The birefringent substrate 110 is made of a positive or negative uniaxial birefringent material.

The birefringent substrate 120 includes a main surface 121 and a main surface 122 opposite to the main surface 121. The birefringent substrate 120 has a plate shape in which the main surface 121 and the main surface 122 are parallel to each other. The plate thickness of the birefringent substrate 120 is, for example, 0.300 [mm], but the plate thickness is not limited to this. The birefringent substrate 120 includes a birefringent material. The birefringent substrate 120 is made of, for example, the same type of birefringent material as that of the birefringent substrate 110. The birefringent substrate 120 is made of, for example, quartz. The birefringent material of the birefringent substrate 120 is not limited to quartz and instead may be the above-described positive or negative uniaxial birefringent material.

The birefringent substrate 120 is disposed over the birefringent substrate 110. For example, the main surface 112 of the birefringent substrate 110 faces the main surface 121 of the birefringent substrate 120. Note that the birefringent substrate 120 being disposed over the birefringent substrate 110 includes not only the case in which the birefringent substrate 120 is disposed over the birefringent substrate 110 in such a way that the main surfaces 112 and 121 are brought into contact with each other but also the case in which the birefringent substrate 120 is disposed over the birefringent substrate 110 with another member such as an adhesive interposed between the main surfaces 112 and 121 and the case in which the birefringent substrate 120 is disposed over the birefringent substrate 110 with a space between the main surfaces 112 and 121.

The main surface 111 of the birefringent substrate 110 is parallel to the main surface 121 of the birefringent substrate 120. When the birefringent substrates 110 and 120 are plate-shaped, the main surface 111, the main surfaces 112, 121, and 122 are parallel to one another.

The birefringent substrate 120 includes an optical axis 123. The direction of the optical axis 123 is parallel to, for example, the main surface 121. That is, the optical axis 123 is a predetermined direction in the XY plane parallel to the main surface 121. For example, when the above-described reference is used, the direction of the optical axis 123 is a direction that forms an angle of 135° with the +X axis. Thus, the optical axis 113 is orthogonal to the optical axis 123. In FIG. 1, the optical axes 113 and 123 are shown in the main surface 111 as the direction viewed from the −Z axis direction, and the optical axes 113 and 123 are shown in the side surfaces of the birefringent substrates 110 and 120, respectively, as the directions viewed from the +Y axis direction.

The birefringent substrate 120 may be a positive or negative uniaxial birefringent material. However, when the birefringent substrate 110 is made of a positive uniaxial birefringent material, the birefringent substrate 120 is preferably made of a positive uniaxial birefringent material, while when the birefringent substrate 110 is made of a negative uniaxial birefringent material, the birefringent substrate 120 is preferably made of a negative uniaxial birefringent material.

In the wave plate 101, the incident light is, for example, polarized light including a linear polarization direction 115. The linear polarization direction 115 is a direction parallel to the Y axis. Thus, the angle formed by the linear polarization direction 115 and the optical axes 113 and 123 is 45[°] The incident light is made incident on the main surface 111 of the birefringent substrate 110 or 122 of the birefringent substrate 120. In the birefringent substrate 110, the polarized light including the linear polarization direction 115 contains a component in the direction of the optical axis 113 (called an α direction) and a component in the direction of the optical axis 123 (called a β direction). In the birefringent substrate 120, the polarized light including the linear polarization direction 115 contains a component in the a direction and a component in the β direction.

Figure 2:
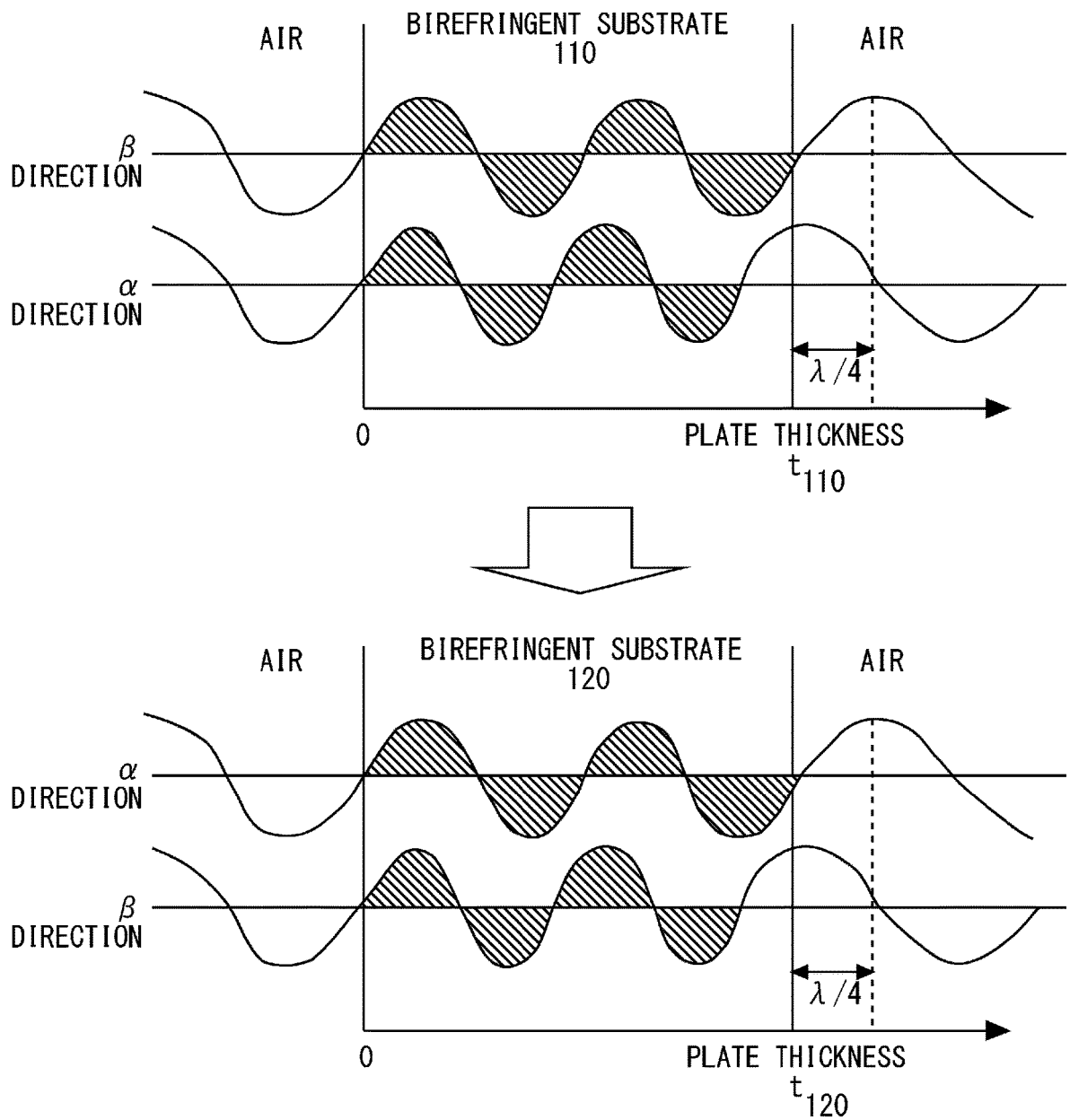
FIG. 2 shows an example of a light wave passing through each birefringent substrate in a compound zero-order type wave plate.

FIG. 2 shows an example of a light wave passing through each birefringent substrate in a compound zero-order type wave plate. As shown in FIG. 2, in the birefringent substrate 110, a light wave travels further in the β direction than in the α direction. For example, after a light wave is transmitted through the birefringent substrate 110, the light wave travels λ/4 further in the β direction than in the α direction. On the other hand, in the birefringent substrate 120, the light wave travels further in the α direction than in the β direction. For example, after a light wave is transmitted through the birefringent substrate 120, the light wave travels λ/4 further in the a direction than in the β direction.

In the wave plate 101, the optical axes 113 and 123 of the birefringent substrates 110 and 120 are orthogonal to each other, and thus the light wave travels or is delayed in the opposite directions between the a direction and the β direction. Then, the phase differences in the birefringent substrates 110 and 120 are cancelled. As a result, a difference between the thickness of the birefringent substrate 110 and that of the birefringent substrate 120 ($t_{110}-t_{120}$) becomes the phase difference in the wave plate 101 that is obtained by bonding the birefringent substrate 110 to the birefringent substrate 120.

Figure 3:
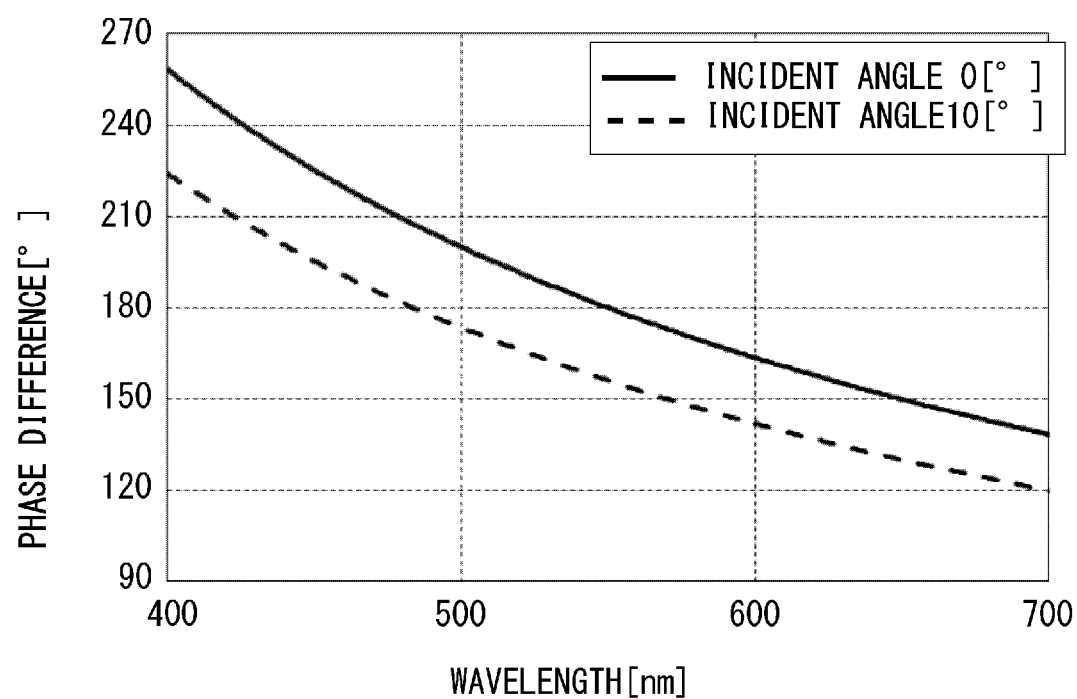
FIG. 3 is a graph showing an example of a phase difference when light is incident on the wave plate according to Comparative Example 1 at incident angles of 0[°] and 10[°], where the horizontal axis represents a wavelength of the incident light, and the vertical axis represents the phase difference.

FIG. 3 is a graph showing an example of a phase difference when light is incident on the wave plate according to Comparative Example 1 at incident angles of 0[°] and 10[°], where the horizontal axis represents a wavelength of the incident light, and the vertical axis represents the phase difference.

As shown in FIG. 3, when the incident angle of the incident light entering the wave plate 101 is changed from an incident angle 0[°] to an incident angle 10[°], the phase difference decreases at any wavelength within the range shown in FIG. 3. Specifically, when the light is incident at an incident angle of 0[°], the phase difference becomes smaller as the wavelength of the incident light becomes larger. For example, the phase differences at the wavelengths of 400 [nm], 500 [nm], 600 [nm], and 700 [nm] are approximately 255 [deg], 200 [deg], 165 [deg], and 140 [deg], respectively. On the other hand, when the light is incident at an incident angle of 10[°], the phase differences at the wavelengths of 400 [nm], 500 [nm], 600 [nm], and 700 [nm] are approximately 225[°], 170[°], 140[°], and 120[°], respectively. Thus, in Comparative Example 1, when the incident angle of the light entering the wave plate 101 changes, the phase difference changes.

COMPARATIVE EXAMPLE 2

Figure 4:
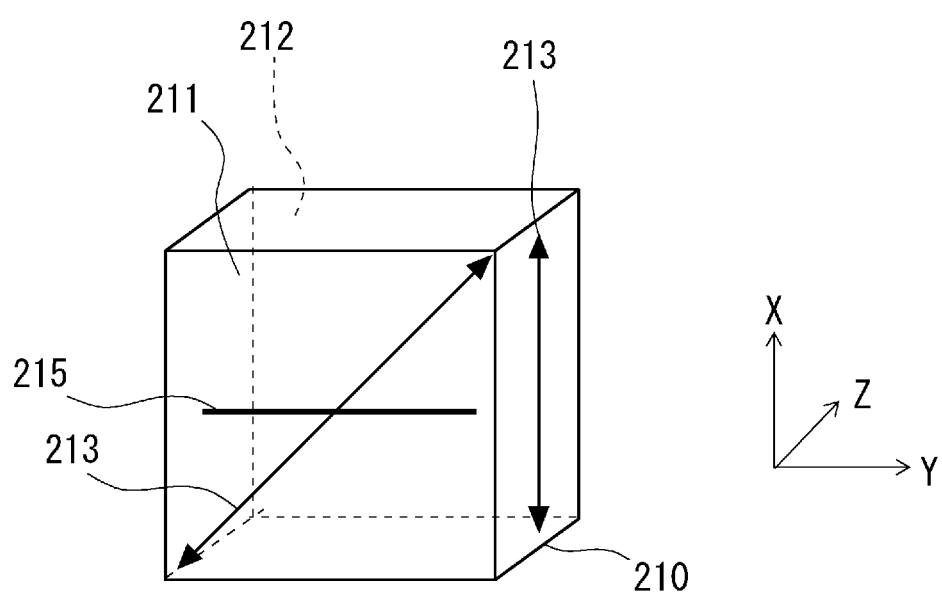
FIG. 4 is a perspective view showing a wave plate according to Comparative Example 2.

Next, Comparative Example 2 will be described. FIG. 4 is a perspective view showing an example of a wave plate according to Comparative Example 2. As shown in FIG. 4, a wave plate 201 according to Comparative Example 2 includes a birefringent substrate 210. The wave plate according to Comparative Example 2 is a multi-order type wave plate.

The birefringent substrate 210 includes a main surface 211 and a main surface 212 opposite to the main surface 211. The birefringent substrate 210 has a plate shape in which the main surfaces 211 and 212 are parallel to each other. The plate thickness of the birefringent substrate 210 is, for example, 0.330 [mm], but the plate thickness is not limited to this. The birefringent substrate 210 includes a birefringent material. The birefringent substrate 210 is made of, for example, quartz. The birefringent material of the birefringent substrate 210 is not limited to quartz and instead may be the above-described positive or negative uniaxial birefringent material.

The birefringent substrate 210 includes an optical axis 213. The direction of the optical axis 213 is parallel to, for example, the main surface 211. That is, the optical axis 213 is a predetermined direction in the XY plane parallel to the main surface 211. For example, when the above-described reference is used, the optical axis 213 is a direction that forms an angle of 45[°] with the +X axis. In FIG. 4, a direction in which the optical axis 213 is viewed from the −Z axis direction is shown in the main surface 211, and a direction in which the optical axis 213 is viewed from the +Y axis direction is shown in a side surface of the birefringent substrate 210. The birefringent substrate 210 is a substrate in which the main surfaces 211 and 212 are X-cut or Y-cut.

In the wave plate 201, the incident light is, for example, polarized light including a linear polarization direction 215. The linear polarization direction 215 is a direction parallel to the Y axis. Thus, the angle formed by the linear polarization direction 215 and the optical axis 213 is 45[°]. The incident light is made incident on the main surface 211 or 212 of the birefringent substrate 210.

Figure 5:
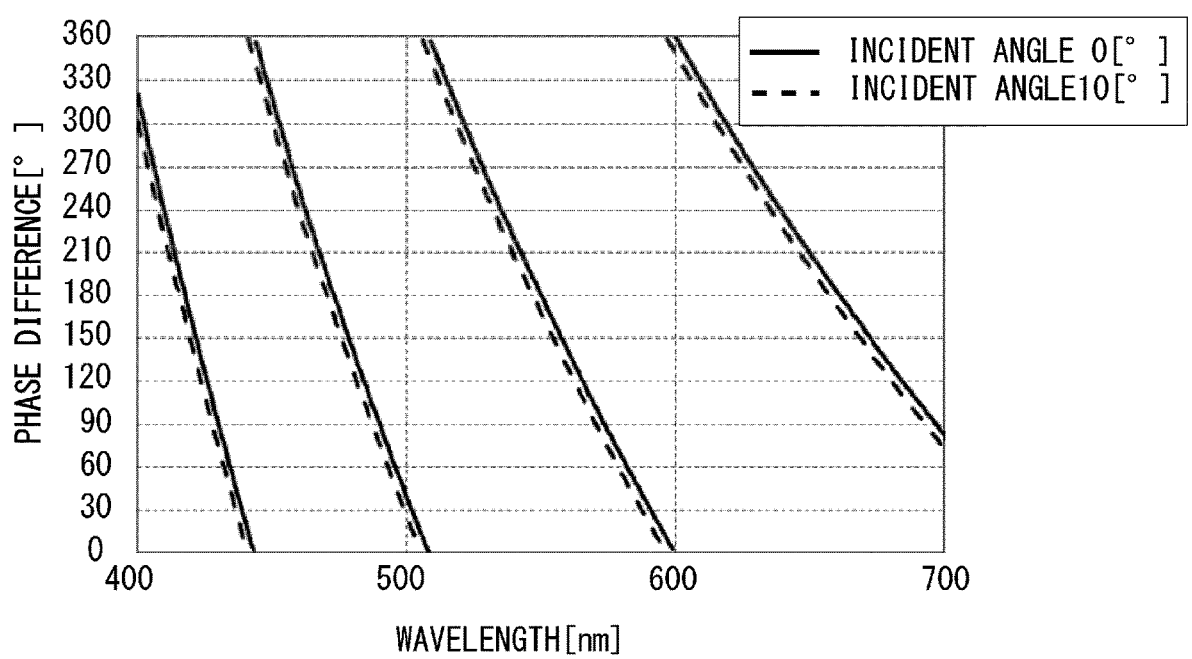
FIG. 5 is a graph showing an example of a phase difference when light is incident on the wave plate according to Comparative Example 2 at incident angles of 0[°] and 10[°], where the horizontal axis represents a wavelength of the incident light, and the vertical axis represents the phase difference.

FIG. 5 is a graph showing an example of a phase difference when light is incident on the wave plate according to Comparative Example 2 at incident angles of 0[°] and 10[°], where the horizontal axis represents a wavelength of the incident light, and the vertical axis represents the phase difference.

As shown in FIG. 5, when the incident angle of the incident light entering the wave plate 201 is changed from an incident angle 0[°] to an incident angle 10[°], the phase difference decreases at any wavelength within the range shown in FIG. 5. Specifically, when the light is incident at an incident angle of 0[°], the phase difference becomes smaller as the wavelength becomes larger within the following ranges of the wavelength of the incident light, i.e., the ranges of about 400 to about 440 [nm], about 440 to about 510 [nm], about 510 to about 600 [nm], and about 600 to 700 [nm]. On the other hand, when the light is incident at an incident angle of 10[°], the phase difference is reduced at any wavelength as compared with when the light is incident at an incident angle of 0[°]. Thus, also in Comparative Example 2, when the incident angle of the light entering the wave plate 101 changes, the phase difference changes.

Like in Comparative Example 1, in the wave plate in which the optical axes of the two birefringent substrates are orthogonal to each other is designed in such a way that light is incident perpendicularly on the main surface. Thus, such a wave plate has a problem that, when light is incident obliquely on the main surface, large angle dependence is generated in the polarization characteristics and the polarization characteristics change. Further, also in a wave plate in which the optical axes of a single birefringent substrate are orthogonal to each other as in Comparative Example 2, when the light is incident obliquely on the main surface, angle dependence is generated in the polarization characteristics, and the polarization characteristics change. Deterioration of polarization characteristics due to a variation in a phase difference caused by an incident angle is hereinafter referred to as incident angle dependence.

The incident angle dependence of the quartz used for the birefringent substrate depends on the thickness of the plate. Specifically, the smaller the thickness, the smaller the incident angle dependence becomes. In the case of a compound zero-order type or a multi-order type wave plate, the thickness of the plate is increased to a thickness that makes the wave plate easy to handle. Thus, the incident angle dependence of the compound zero-order type or a multi-order type wave plate deteriorates as compared with the zero-order type wave plate. In the berek type wave plate, the incident angle dependence is worsened by the influence of the shifted optical axis.

When the wave plate is used in an optical apparatus such as a liquid crystal projector or an optical pickup, the wave plate may be disposed over a path where light converges in a conical form due to the arrangement of a light source and a lens system. In this case, a light beam is perpendicularly incident on the wave plate in the vicinity of the center of the light beam, and is incident obliquely on the wave plate at an end part of the conical form. Then, an incident angle becomes greater than 0[°]. Thus, the incident angle dependence is worsened also in this case.

There is another problem that the change in the polarization state causes a decrease in characteristics of the liquid crystal panel, which causes a decrease in contrast and brightness and a color shift and the like of a video projected from the projector.

Even when light with a divergence angle from a laser diode light source is made incident on a wave plate in order to reduce the size of an optical apparatus, the incident angle dependence of the phase difference in the wave plate becomes a problem.

(Incident Angle Dependence and Principle of Correction)

Figure 6:
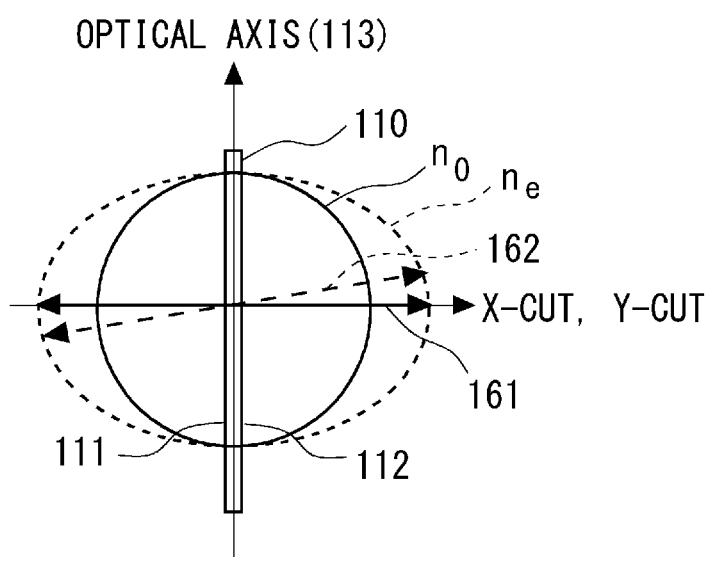
FIG. 6 shows an example of incident angle dependence.

Next, the incident angle dependence and the principle of correcting the incident angle dependence will be described. FIG. 6 shows an example of the incident angle dependence. In FIG. 6, a solid-line circle represents a magnitude of the ordinary ray refractive index no, and a dotted-line ellipse represents a magnitude of the extraordinary ray refractive index $n_e$. As shown in FIG. 6, the birefringent substrate 110 will be described as an example. The same applies to other birefringent substrates.

When the incident angle of the incident light entering the birefringent substrate 110 having the optical axis 113 orthogonal to the normal line of the birefringent substrate 110 changes from 0[°] (arrow 161 in FIG. 6) to another incident angle (arrow 162 in FIG. 6), a difference between the ordinary ray refractive index no and the extraordinary ray refractive index $n_e$ becomes smaller. Thus, as shown in Comparative Examples 1 and 2, when the incident angle changes, the phase difference also changes. Then, the incident angle dependence, i.e., the phase difference changes by the incident angle, is generated, and the polarization characteristics deteriorate.

Figure 7:
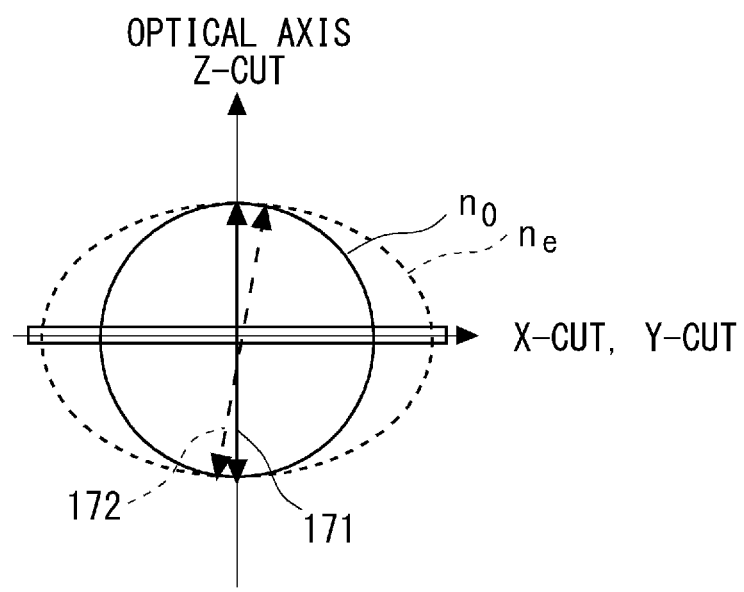
FIG. 7 shows an example of a principle of correcting the incident angle dependence.

FIG. 7 shows an example of the principle of correcting the incident angle dependence. Also in FIG. 7, the solid-line circle represents a magnitude of the ordinary ray refractive index no, and the dotted-line ellipse represents a magnitude of the extraordinary ray refractive index $n_e$. As shown in FIG. 7, when an incident angle of incident light entering a birefringent substrate including an optical axis parallel to a normal line of the birefringent substrate changes from 0[°] (arrow 171 in FIG. 7) to another incident angle (arrow 172 in FIG. 7), a difference between the ordinary ray refractive index no and the extraordinary ray refractive index $n_e$ becomes larger. Thus, a phase change caused by the incident angle of the birefringent substrate 110 including an optical axis orthogonal to the normal line of the birefringent substrate 110 can be cancelled by the phase change caused by the incident angle of the birefringent substrate including an optical axis parallel to the normal line of the birefringent substrate. In this way, the incident angle dependence can be corrected.

First Embodiment

Figure 8:
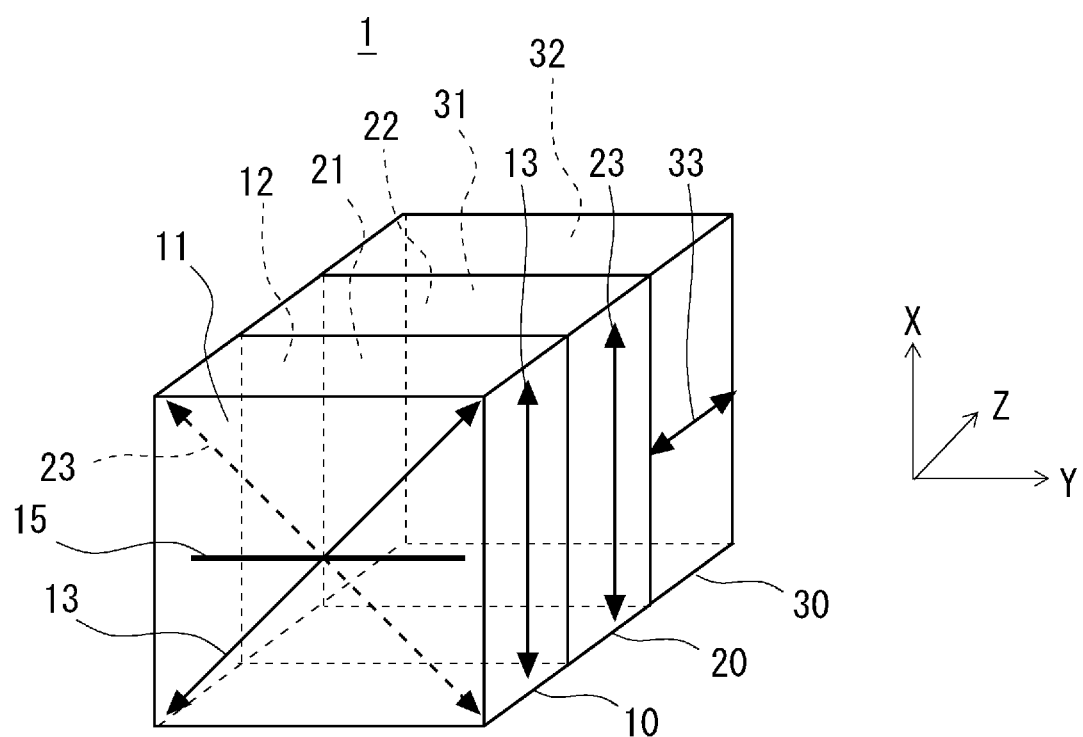
FIG. 8 is a perspective view showing a wave plate according to a first embodiment.

Next, a wave plate according to the first embodiment will be described. FIG. 8 is a perspective view showing an example of the wave plate according to the first embodiment. As shown in FIG. 8, a wave plate 1 according to the first embodiment includes birefringent substrates 10, 20, and 30. The wave plate 1 according to the first embodiment is an example in which the incident angle dependence of a compound zero-order type wave plate is corrected using the birefringent substrate 30 with no optical rotation property.

The birefringent substrate 10 includes a main surface 11 and a main surface 12 opposite to the main surface 11. The birefringent substrate 10 has a plate shape in which the main surfaces 11 and 12 are parallel to each other. The plate thickness of the birefringent substrate 10 is, for example, 0.330 [mm], but the plate thickness is not limited to this. The birefringent substrate 10 includes a birefringent material. The birefringent substrate 10 is made of, for example, quartz. The birefringent material of the birefringent substrate 10 is not limited to quartz and instead may be the above-described positive or negative uniaxial birefringent material.

The birefringent substrate 10 includes an optical axis 13. The direction of the optical axis 13 is parallel to, for example, the main surface 11. That is, the optical axis 13 is a predetermined direction in the XY plane parallel to the main surface 11. For example, when the above-described reference is used, the optical axis 13 is a direction that forms an angle of 45[°] with the +X axis.

The birefringent substrate 20 includes a main surface 21 and a main surface 22 opposite to the main surface 21. The birefringent substrate 20 has a plate shape in which the main surfaces 21 and 22 are parallel to each other. The plate thickness of the birefringent substrate 20 is, for example, 0.300 [mm], but the plate thickness is not limited to this. However, the birefringent substrates 10 and 20 are designed in such a way that a difference between a thickness of the birefringent substrate 10 and that of the birefringent substrate 20 becomes a phase difference as the wave plate 1. The birefringent substrate 20 includes a birefringent material. The birefringent substrates 20 and 10 are made of the same type of birefringent material. The birefringent substrate 20 is made of, for example, quartz. The birefringent material of the birefringent substrate 10 is not limited to quartz and instead may be the above-described positive or negative uniaxial birefringent material as long as the birefringent material of the birefringent substrate 20 is the same type of birefringent material as that of the birefringent substrate 10. Thus, when the birefringent substrate 10 is made of a positive birefringent material, the birefringent substrate 20 is made of a positive birefringent material, while when the birefringent substrate 10 is made of a negative birefringent material, the birefringent substrate 20 is made of a negative birefringent material.

The birefringent substrate 20 is disposed over the birefringent substrate 10. Thus, the main surface 12 of the birefringent substrate 10 and the main surface 21 of the birefringent substrate 20 face each other. Note that, as described above, the birefringent substrate 20 being disposed over the birefringent substrate 10 includes the case in which the main surfaces 12 and 21 are in contact with each other, the case in which another member is interposed between the main surfaces 12 and 21, and the case in which the birefringent substrate 20 is disposed over the birefringent substrate 10 with a space between the main surfaces 12 and 21. The same applied to the following descriptions.

The main surface 11 of the birefringent substrate 10 is disposed in parallel to the main surface 21 of the birefringent substrate 20. When the birefringent substrates 10 and 20 are plate-shaped, the main surfaces 11, 12, 21, and 22 are parallel to one another.

The birefringent substrate 20 includes an optical axis 23. The direction of the optical axis 23 is parallel to, for example, the main surface 21. That is, the optical axis 23 is a predetermined direction in the XY plane parallel to the main surface 21. For example, when the above-described reference is used, the optical axis 23 is a direction that forms an angle of 135[°] with the +X axis. Thus, the direction of the optical axis 13 is orthogonal to the direction of the optical axis 23.

The birefringent substrate 30 includes a main surface 31 and a main surface 32 opposite to the main surface 31. The birefringent substrate 30 has a plate shape in which the main surfaces 31 and 32 are parallel to each other. The plate thickness of the birefringent substrate 30 is, for example, 0.190 [mm], but the plate thickness is not limited to this. The birefringent substrate 30 includes a birefringent material. The birefringent material of the birefringent substrate 30 may be, for example, the same type of birefringent material as that of the birefringent substrates 10 and 20 or may be a birefringent material different from that of the birefringent substrates 10 and 20. The birefringent substrate 30 contains, for example, $MgF_2$ as a material. Note that the birefringent material of the birefringent substrate 30 may be the above-described positive or negative uniaxial birefringent material as long as it is not quartz with an optical rotation property. When the birefringent substrates 10 and 20 are made of a positive birefringent material, the birefringent substrate 30 is made of a positive birefringent material, while when the birefringent substrates 10 and 20 are made of a negative birefringent material, the birefringent substrate 30 is made of a negative birefringent material.

The birefringent substrate 30 is disposed over the birefringent substrate 20. Thus, the main surface 22 of the birefringent substrate 20 and the main surface 31 of the birefringent substrate 30 face each other. The main surface 31 of the birefringent substrate 30 is disposed in parallel to the main surface 11 and the main surface 21. When the birefringent substrate 10, the birefringent substrates 20 and 30 are plate-shaped, the main surfaces 11, 12, 21, 22, 31, and 32 are parallel to one another.

The birefringent substrate 30 includes an optical axis 33. The direction of the optical axis 33 is orthogonal to, for example, the main surface 31. That is, the direction of the optical axis 33 is the Z direction orthogonal to the main surface 31. Thus, the direction of the optical axis 33 is orthogonal to the directions of the optical axes 13 and 23. In FIG. 8, directions in which the optical axes 13 and 23 are viewed from the −Z axis direction are shown in the main surface 11, and directions in which the optical axes 13, 23 and 33 are viewed from the +Y axis direction are shown in side surfaces of the birefringent substrates 10, 20, and 30, respectively.

The incident light is, for example, polarized light including a linear polarization direction 15. The linear polarization direction 15 is, for example the Y axis parallel to the main surface 11. Thus, the angle formed by the linear polarization direction 15 and the optical axes 13 and 23 is 45[°] That is, the angle formed by the linear polarization direction 15 and the optical axis 13 is equal to the angle formed by the linear polarization direction 15 and the optical axis 23.

The wave plate 1 is, for example, a λ/2 wave plate, and the incident light entering the main surface 11 and linearly polarized in the linear polarization direction 15 is emitted from the birefringent substrate 30 as light linearly polarized in the X axis direction. When the wave plate 1 is a λ/2 wave plate, the incident angle dependence can be corrected regardless of whether the incident light is incident from the main surface 11 or 32.

Further, the wave plate 1 is, for example, a λ/4 wave plate, and the incident light entering the main surface 32 and linearly polarized parallel to the main surface 32 is emitted from the birefringent substrate 10 as circularly polarized light. When the wave plate 1 is a λ/4 wave plate, the incident angle dependence can be corrected by making the incident light incident from the main surface 32. On the other hand, the incident angle dependence cannot be corrected by making incident light incident from the main surface 11.

Figure 9:
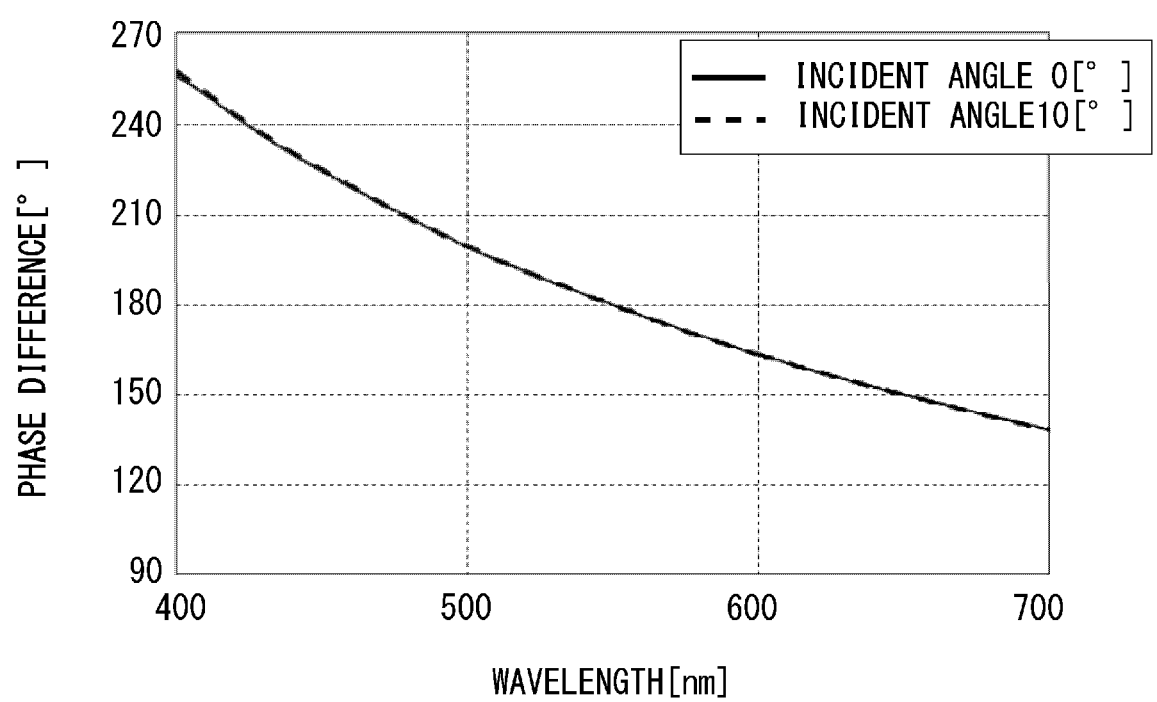
FIG. 9 is a graph showing an example of a phase difference when light is incident on the wave plate according to the first embodiment at incident angles of 0[°] and 10[°], where the horizontal axis represents a wavelength of the incident light, and the vertical axis represents the phase difference.

FIG. 9 is a graph showing an example of a phase difference when light is incident on the wave plate according to the first embodiment at incident angles of 0[°] and 10[°], where the horizontal axis represents a wavelength of the incident light, and the vertical axis represents the phase difference.

As shown in FIG. 9, when the incident angle of the incident light entering the wave plate 1 is changed from an incident angle 0[°] to an incident angle 10[°], the change in the phase difference is below a measurement limit at the wavelengths within the range shown in the drawing. Specifically, when the light is incident at an incident angle of 0[°], the phase difference becomes smaller as the wavelength of the incident light becomes larger. For example, the phase differences at the wavelengths of 400 [nm], 500 [nm], 600 [nm], and 700 [nm] are approximately 255 [deg], 200 [deg], 165 [deg], and 140 [deg], respectively. The phase difference when the light is incident at an incident angle of 10[°] will become the same as the case when the incident light is incident at an incident angle of 0[°].

Next, effects of this embodiment will be described. The wave plate 1 according to this embodiment includes the birefringent substrates 10 and 20 including the optical axes 13 and 23 parallel to the main surfaces 11 and 21, and the birefringent substrate 30 including the optical axis 33 orthogonal to the main surface 31. Thus, a change caused by the incident angle of the incident light entering the birefringent substrates 10 and 20 can be cancelled by changing the incident angle of the incident light entering the birefringent substrate 30. In this way, the incident angle dependence can be corrected. In other words, the incident angle dependence of the wave plate 101 according to Comparative Example 1 composed of the birefringent substrates 110 and 120 can be corrected by adding the birefringent substrate 30.

When the incident angle of the light entering the main surfaces 31 and 32 of the birefringent substrate 30 is 0[°], a difference between the ordinary ray refractive index no and the extraordinary ray refractive index $n_e$ in the birefringent substrate 30, which is added for correction, is 0. Thus, when the incident light is incident on the wave plate 1 at an incident angle of 0[°], the influence of the phase difference due to the birefringent substrate 30 can be eliminated.

Further, the thickness of the wave plate 1 can be set to a thickness that makes the wave plate 1 easy to handle. Thus, the thickness of the wave plate 1 can be a thickness that makes the wave plate 1 easy to handle as compared with a polymer wave plate while the wave plate 1 is made of an inorganic birefringent material and has the functions equivalent to or more functions than those of the polymer wave plate.

Second Embodiment

Figure 10:
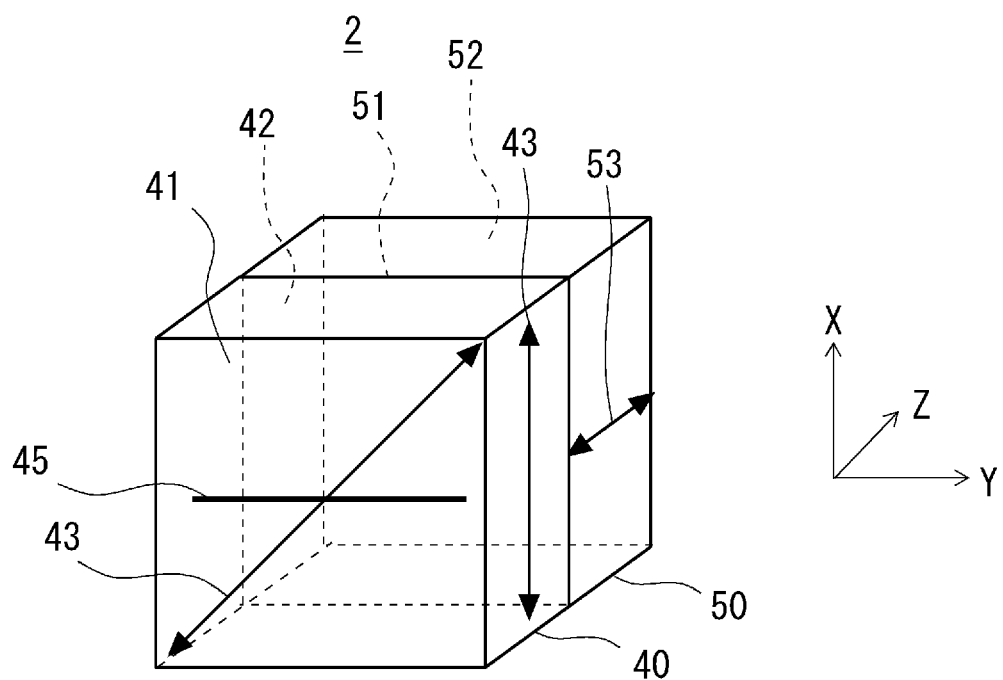
FIG. 10 is a perspective view showing an example of a wave plate according to a second embodiment.

Next, a wave plate according to a second embodiment will be described. FIG. 10 is a perspective view showing an example of the wave plate according to the second embodiment. As shown in FIG. 10, the wave plate 2 according to the second embodiment includes birefringent substrates 40 and 50. The wave plate 2 according to the second embodiment is an example in which the incident angle dependence of a multi-order type wave plate is corrected using the birefringent substrate 50 with no optical rotation property.

The birefringent substrate 40 includes a main surface 41 and a main surface 42 opposite to the main surface 41. The birefringent substrate 40 has a plate shape in which the main surfaces 41 and 42 are parallel to each other. The plate thickness of the birefringent substrate 40 is, for example, 0.330 [mm], but the plate thickness is not limited to this. The birefringent substrate 40 includes a birefringent material. The birefringent substrate 40 is made of, for example, quartz. The birefringent material of the birefringent substrate 40 is not limited to quartz and instead may be the above-described positive or negative uniaxial birefringent material.

The birefringent substrate 40 includes an optical axis 43. The direction of the optical axis 43 is parallel to, for example, the main surface 41. That is, when the above-described reference is used, the direction of the optical axis 43 is a direction that forms an angle of 45[°] with the +X axis.

The birefringent substrate 50 includes a main surface 51 and a main surface 52 opposite to the main surface 51. The birefringent substrate 50 has a plate shape in which the main surfaces 51 and 52 are parallel to each other. The plate thickness of the birefringent substrate 50 is, for example, 0.100 [mm], but the plate thickness is not limited to this. The birefringent substrate 50 includes a birefringent material. The birefringent material of the birefringent substrate 50 may be, for example, the same type of birefringent material as that of the birefringent substrate 40 or may be a birefringent material different from that of the birefringent substrate 40. The birefringent substrate 50 is made of, for example, $MgF_2$. Note that the birefringent material of the birefringent substrate 50 may be the above-described positive or negative uniaxial birefringent material as long as it is not quartz with an optical rotation property. When the birefringent substrate 40 is made of a positive birefringent material, the birefringent substrate 50 is made of a positive birefringent material, while when the birefringent substrate 40 is made of a negative birefringent material, the birefringent substrate 50 is made of a negative birefringent material.

The birefringent substrate 50 is disposed over the birefringent substrate 40. Thus, the main surface 42 of the birefringent substrate 40 and the main surface 51 of the birefringent substrate 50 face each other. The main surface 51 of the birefringent substrate 50 is disposed in parallel to the main surface 41 of the birefringent substrate 40. When the birefringent substrates 40 and 50 are plate-shaped, the main surfaces 41, 42, 51, and 52 are parallel to one another.

The birefringent substrate 50 includes an optical axis 53. The direction of the optical axis 53 is orthogonal to, for example, the main surface 51. That is, the direction of the optical axis 53 is the Z direction orthogonal to the main surface 51. Thus, the direction of the optical axis 53 is orthogonal to the direction of the optical axis 43. In FIG. 10, a direction in which the optical axis 43 is viewed from the −Z axis direction is shown in the main surface 41, and directions in which the optical axes 43 and 53 are viewed from the +Y axis direction are shown in side surfaces of the birefringent substrates 40 and 50, respectively.

The incident light is polarized light including a linear polarization direction 45. The linear polarization direction 45 is parallel to the Y axis. Thus, the angle formed by the linear polarization direction 45 and the optical axis 43 is 45[°]. The wave plate 2 is, for example, a λ/2 wave plate, and the incident light entering the main surface 41 and linearly polarized in the linear polarization direction 45 is emitted from the birefringent substrate 50 as light linearly polarized in the X axis direction. When the wave plate 2 is a λ/2 wave plate, the incident angle dependence can be corrected regardless of whether the incident light is incident from the main surface 41 or 52.

Further, the wave plate 2 is, for example, a λ/4 wave plate, and the incident light entering the main surface 52 and linearly polarized parallel to the main surface 52 is emitted from the birefringent substrate 40 as circularly polarized light. When the wave plate 2 is a λ/4 wave plate, the incident angle dependence can be corrected by making the incident light incident from the main surface 52. On the other hand, the incident angle dependence cannot be corrected by making incident light incident from the main surface 41.

Figure 11:
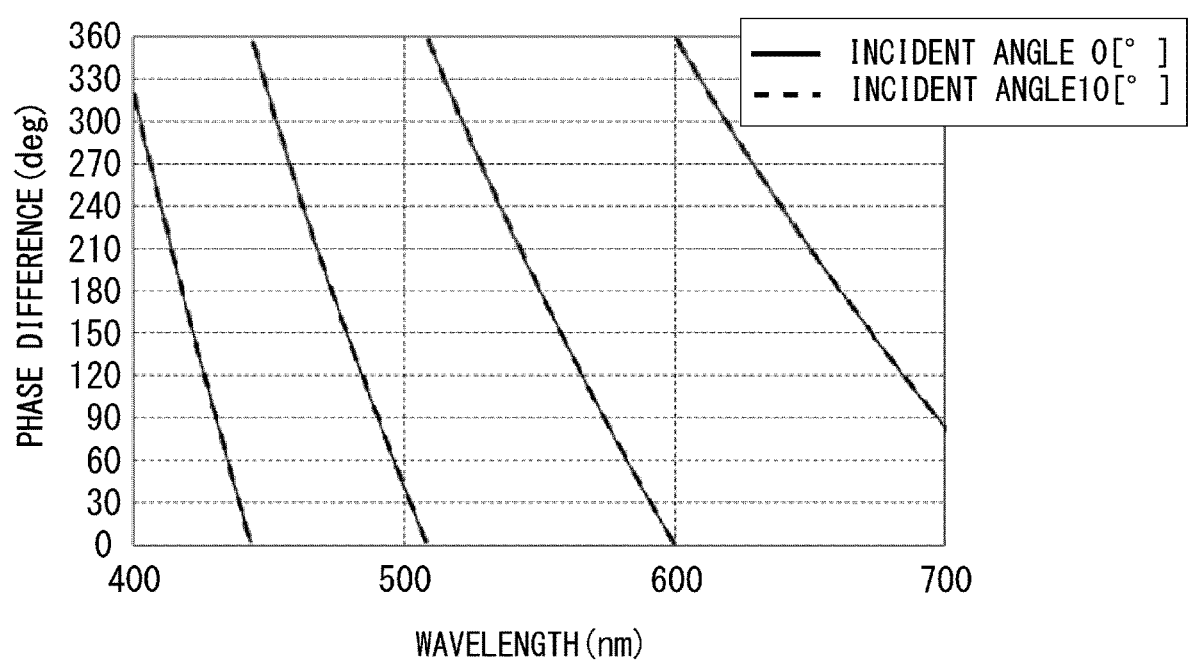
FIG. 11 is a graph showing an example of a phase difference when light is incident on the wave plate according to the second embodiment at incident angles of 0[°] and 10[°], where the horizontal axis represents a wavelength of the incident light, and the vertical axis represents the phase difference.

FIG. 11 is a graph showing an example of a phase difference when light is incident on the wave plate according to the second embodiment at incident angles of 0[°] and 10[°], where the horizontal axis represents a wavelength of the incident light, and the vertical axis represents the phase difference.

As shown in FIG. 11, when the incident angle of the incident light entering the wave plate 2 is changed from an incident angle 0[°] to an incident angle 10[°], the change in the phase difference is below a measurement limit at the wavelengths within the range shown in the drawing.

Next, effects of this embodiment will be described. The wave plate 2 according to this embodiment includes the birefringent substrate 40 including the optical axis 43 parallel to the main surface 41, and the birefringent substrate 50 including the optical axis 53 orthogonal to the main surface 51. Thus, the phase change caused by the incident angle of the incident light entering the birefringent substrate 40 can be cancelled by the phase change of the incident angle of the incident light entering the birefringent substrate 50. In this way, the incident angle dependence can be corrected. In other words, the incident angle dependence of the wave plate 201 according to Comparative Example 2 composed of the birefringent substrate 210 can be corrected by adding the birefringent substrate 50. Other configurations and effects are described in the first embodiment.

Third Embodiment

Figure 12:
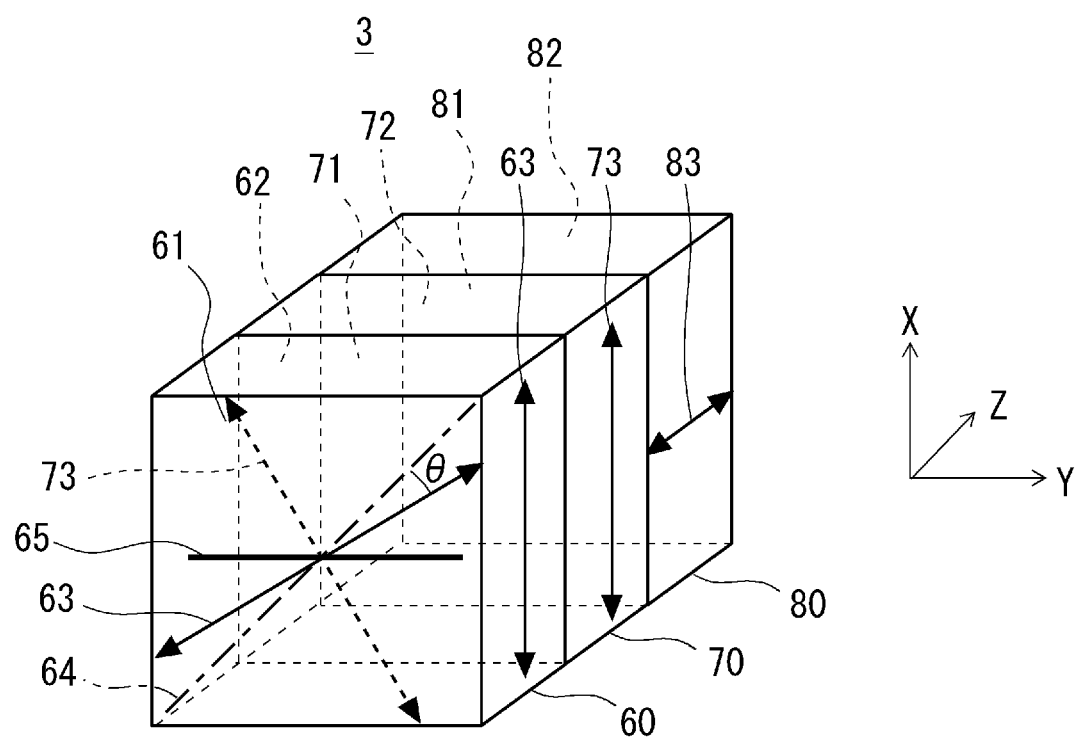
FIG. 12 is a perspective view showing a wave plate according to a third embodiment.

Next, a wave plate according to the third embodiment will be described. FIG. 12 is a perspective view showing an example of a wave plate according to the third embodiment. As shown in FIG. 12, a wave plate 3 according to the third embodiment includes birefringent substrates 60, 70, and 80. The wave plate 3 according to the third embodiment is an example in which the incident angle dependence of a compound zero-order type wave plate is corrected using the birefringent substrate 80 with an optical rotation property.

The birefringent substrate 60 includes a main surface 61 and a main surface 62 opposite to the main surface 61. The birefringent substrate 60 has a plate shape in which the main surfaces 61 and 62 are parallel to each other. The plate thickness of the birefringent substrate 60 is, for example, 0.330 [mm], but the plate thickness is not limited to this. The birefringent substrate 60 includes a birefringent material. The birefringent substrate 60 is made of, for example, quartz. The birefringent material of the birefringent substrate 60 is not limited to quartz and instead may be the above-described birefringent material as long as it is a positive uniaxial birefringent material.

The birefringent substrate 60 includes an optical axis 63. The direction of the optical axis 63 is parallel to, for example, the main surface 61. That is, the optical axis 63 is a predetermined direction in the XY plane parallel to the main surface 11. That is, when the above-described reference is used, the direction of the optical axis 63 is a direction that forms an angle of (45+θ)[°] with the +X axis. The angle θ is an angle for correcting the optical rotation property of the birefringent substrate 80 as described later, and is, for example, 3[°] 57 [']. A pre-corrected optical axis 64 before the optical rotation property is corrected is a direction that forms an angle of 45[°] with the +X axis.

The birefringent substrate 70 includes a main surface 71 and a main surface 72 opposite to the main surface 71. The birefringent substrate 70 has a plate shape in which the main surfaces 71 and 72 are parallel to each other. The plate thickness of the birefringent substrate 70 is, for example, 0.300 [mm], but the plate thickness is not limited to this. However, the birefringent substrates 10 and 20 are designed in such a way that a difference between a thickness of the birefringent substrate 60 and that of the birefringent substrate 70 becomes a phase difference as the wave plate 3. The birefringent substrate 70 includes a birefringent material. The birefringent substrate 70 is made of, for example, the same type of birefringent material as that of the birefringent substrate 60. The birefringent substrate 70 is made of, for example, quartz. The birefringent material of the birefringent substrate 70 is not limited to quartz as long as it is the same type as that of the birefringent substrate 60 and may be the above-described birefringent material.

The birefringent substrate 70 is disposed over the birefringent substrate 60. Thus, the main surface 62 of the birefringent substrate 60 and the main surface 71 of the birefringent substrate 70 face each other. The main surface 61 of the birefringent substrate 60 is parallel to the main surface 71 of the birefringent substrate 70. When the birefringent substrates 60 and 70 are plate-shaped, the main surfaces 61, 62, 71, and 72 are parallel to one another.

The birefringent substrate 70 includes an optical axis 73. The direction of the optical axis 73 is parallel to, for example, the main surface 71. That is, the optical axis 73 is a predetermined direction in the XY plane parallel to the main surface 71. For example, when the above-described reference is used, the optical axis 73 is a direction that forms an angle of (135+0) [°] with the +X axis. The angle θ is an angle for correcting the optical rotation property of the birefringent substrate 80, and is, for example, 3[°] 57 [']. Thus, the optical axis 63 is orthogonal to the optical axis 73.

The birefringent substrate 80 includes a main surface 81 and a main surface 82 opposite to the main surface 81. The birefringent substrate 80 has a plate shape in which the main surfaces 81 and 82 are parallel to each other. The plate thickness of the birefringent substrate 80 is, for example, 0.312 [mm], but the plate thickness is not limited to this. The birefringent substrate 80 includes a birefringent material with an optical rotation property. The birefringent material of the birefringent substrate 80 may be, for example, the same type of birefringent material as that of the birefringent substrates 60 and 70 or may be a birefringent material different from that of the birefringent substrates 60 and 70. The birefringent substrate 80 is made of, for example, quartz.

The birefringent substrate 80 is disposed over the birefringent substrate 70. Thus, the main surface 72 of the birefringent substrate 70 and the main surface 81 of the birefringent substrate 80 face each other. The main surface 81 of the birefringent substrate 80 is parallel to the main surface 71 of the birefringent substrate 70. When the birefringent substrates 60, 70, and 80 are plate-shaped, the main surfaces 61, 62, 71, 72, 81, and 82 are parallel to one another.

The birefringent substrate 80 includes an optical axis 83. The direction of the optical axis 83 is orthogonal to, for example, the main surface 81. That is, the direction of the optical axis 83 is the Z direction orthogonal to the main surface 81. Thus, the optical axis 83 is orthogonal to the optical axes 63 and 73. In FIG. 12, directions in which the optical axes 63 and 73 are viewed from the −Z axis direction are shown in the main surface 61, and directions in which the optical axes 63, 73, and 83 are viewed from the +Y axis direction are shown in side surfaces of the birefringent substrates 60, 70, and 80, respectively.

The incident light is polarized light including a linear polarization direction 65. The linear polarization direction 65 is a direction parallel to the Y axis. When the wave plate 3 is a λ/2 wave plate, the incident angle dependence can be corrected regardless of whether the incident light is incident from the main surface 61 or 82. When the light is incident from the main surface 82, the angle θ for correcting the optical rotation property is reversely rotated as compared with when the light is incident from the main surface 61. When the wave plate 3 is a λ/4 wave plate, the incident angle dependence cannot be corrected.

The angle θ for correcting the optical rotation property of the birefringent substrate 80 is, for example, θ=ψ/2. Here, ψ is calculated by the following formula (1).

$$\psi = [7.19\lambda^2(\lambda^2 - 92.6^2)^2] \times 10^6 \times t \quad (1)$$

The unit of ψ is [°]. In this formula, λ is a wavelength [nm], and t is a plate thickness [mm]. In order to correct the optical rotation property, the angle between the linear polarization direction 65 and the direction of the optical axis 63 differs from the angle between the linear polarization direction 65 and the direction of the optical axis 73. Specifically, the angle between the linear polarization direction 65 and the direction of the optical axis 63 is 45−θ[°], and the angle between the linear polarization direction 65 and the direction of the optical axis 73 is 45+θ[°].

Also in the wave plate 3 according to this embodiment, the phase change caused by the incident angle of the incident light entering the birefringent substrates 60 and 70 can be cancelled by the phase change of the incident angle of the incident light entering the birefringent substrate 80. In this way, the incident angle dependence can be corrected. However, since the birefringent substrate 80 has an optical rotation property, it is necessary to correct the optical axes 63 and 73 by an amount of the optical rotation property.

Fourth Embodiment

Figure 13:
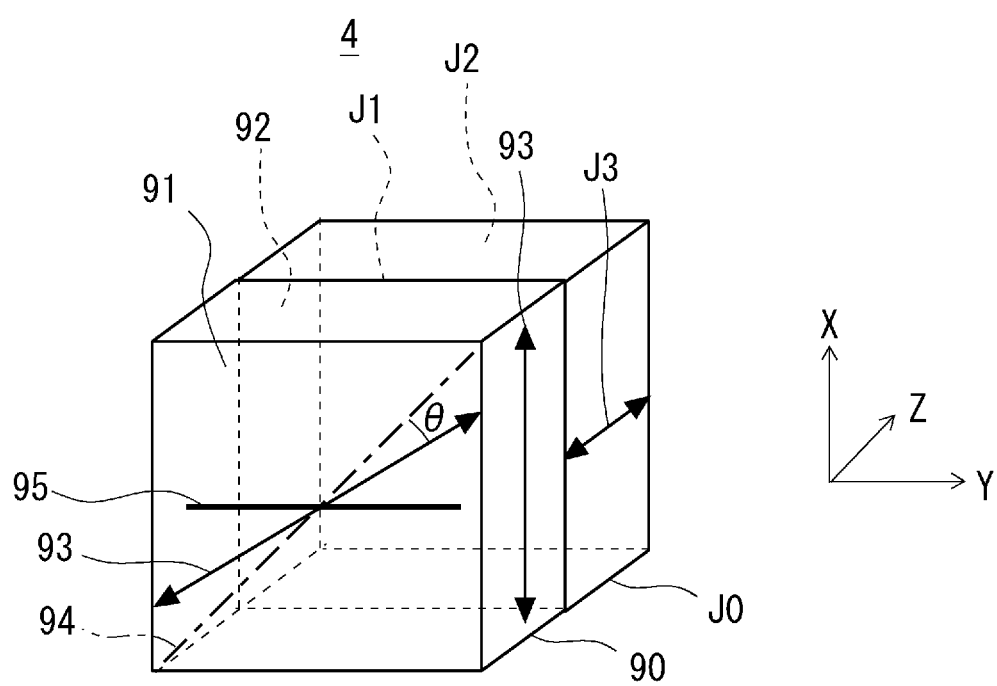
FIG. 13 is a perspective view showing a wave plate according to a fourth embodiment.

Next, a wave plate according to a fourth embodiment will be described. FIG. 13 is a perspective view showing an example of a wave plate according to the fourth embodiment. As shown in FIG. 13, the wave plate 4 according to the fourth embodiment includes birefringent substrates 90 and J0. The wave plate 4 according to the fourth embodiment is an example in which the incident angle dependence of a multi-order type wave plate is corrected using the optically birefringent substrate J0 with an optical rotation property.

The birefringent substrate 90 includes a main surface 91 and a main surface 92 opposite to the main surface 91. The birefringent substrate 90 has a plate shape in which the main surfaces 91 and 92 are parallel to each other. The plate thickness of the birefringent substrate 90 is, for example, 0.330 [mm], but the plate thickness is not limited to this. The birefringent substrate 90 includes a birefringent material. The birefringent substrate 90 is made of, for example, quartz. The birefringent material of the birefringent substrate 90 is not limited to quartz and instead may be the above-described birefringent material as long as it is a positive uniaxial birefringent material.

The birefringent substrate 90 includes an optical axis 93. The direction of the optical axis 93 is parallel to, for example, the main surface 91. That is, the optical axis 93 is a predetermined direction in the XY plane parallel to the main surface 91. For example, when the above-described reference is used, the direction of the optical axis 93 is a direction that forms an angle of $(45+\theta)[°]$ with the +X axis. The angle $\theta$ is an angle for correcting the optical rotation property of the birefringent substrate J0, and is, for example, 2[°] 5 [']. A pre-corrected optical axis 94 before the optical rotation property is corrected is a direction that forms an angle of 45[°] with the +X axis.

The birefringent substrate J0 includes a main surface J1 and a main surface J2 opposite to the main surface J1. The birefringent substrate J0 has a plate shape in which the main surfaces J1 and J2 are parallel to each other. The plate thickness of the birefringent substrate J0 is, for example, 0.165 [mm], but the plate thickness is not limited to this. The birefringent substrate J0 includes a birefringent material with an optical rotation property. The birefringent material of the birefringent substrate J0 may be, for example, the same type of birefringent material as that of the birefringent substrate 90 or may be a birefringent material different from that of the birefringent substrate 90. The birefringent substrate J0 is made of, for example, quartz.

The birefringent substrate J0 is disposed over the birefringent substrate 90. Thus, the main surface 92 of the birefringent substrate 90 and the main surface J1 of the birefringent substrate J0 face each other. The main surface J1 of the birefringent substrate J0 is parallel to the main surface 91 of the birefringent substrate 90. When the birefringent substrates 90 and J0 are plate-shaped, the main surfaces 91, 92, J1, and J2 are parallel to one another.

The birefringent substrate J0 includes an optical axis J3. The direction of the optical axis J3 is orthogonal to, for example, the main surface J1. That is, the optical axis J3 is the Z direction orthogonal to the main surface J1. Thus, the optical axis J3 is orthogonal to the optical axis 93. In FIG. 13, a direction in which the optical axis 93 is viewed from the -Z axis direction is shown in the main surface 91, and directions in which the optical axes 93 and J3 are viewed from the +Y axis direction are shown in side surfaces of the birefringent substrates 90 and J0, respectively.

The incident light is polarized light including a linear polarization direction 95. The linear polarization direction 95 is a direction parallel to the Y axis. Thus, the angle between the linear polarization direction 95 and the optical axis 93 is different from 45 H. When the wave plate 4 is a $\lambda/2$ wave plate, the incident angle dependence can be corrected regardless of whether the incident light is incident from the main surface 91 or J2. However, when the wave plate 4 is a $\lambda/4$ wave plate, the incident angle dependence cannot be corrected.

The angle $\theta$ for correcting the optical rotation property of the birefringent substrate J0 is calculated by, for example, the above formula (1).

Also in the wave plate 4 according to this embodiment, the phase change caused by the incident angle of the incident light entering the birefringent substrate 90 can be cancelled by the phase change of the incident angle of the incident light entering the birefringent substrate J0. In this way, the incident angle dependence can be corrected. However, since the birefringent substrate J0 has an optical rotation property, it is necessary to correct the optical axis 93 by an amount of the optical rotation property.

Fifth Embodiment

Figure 14:
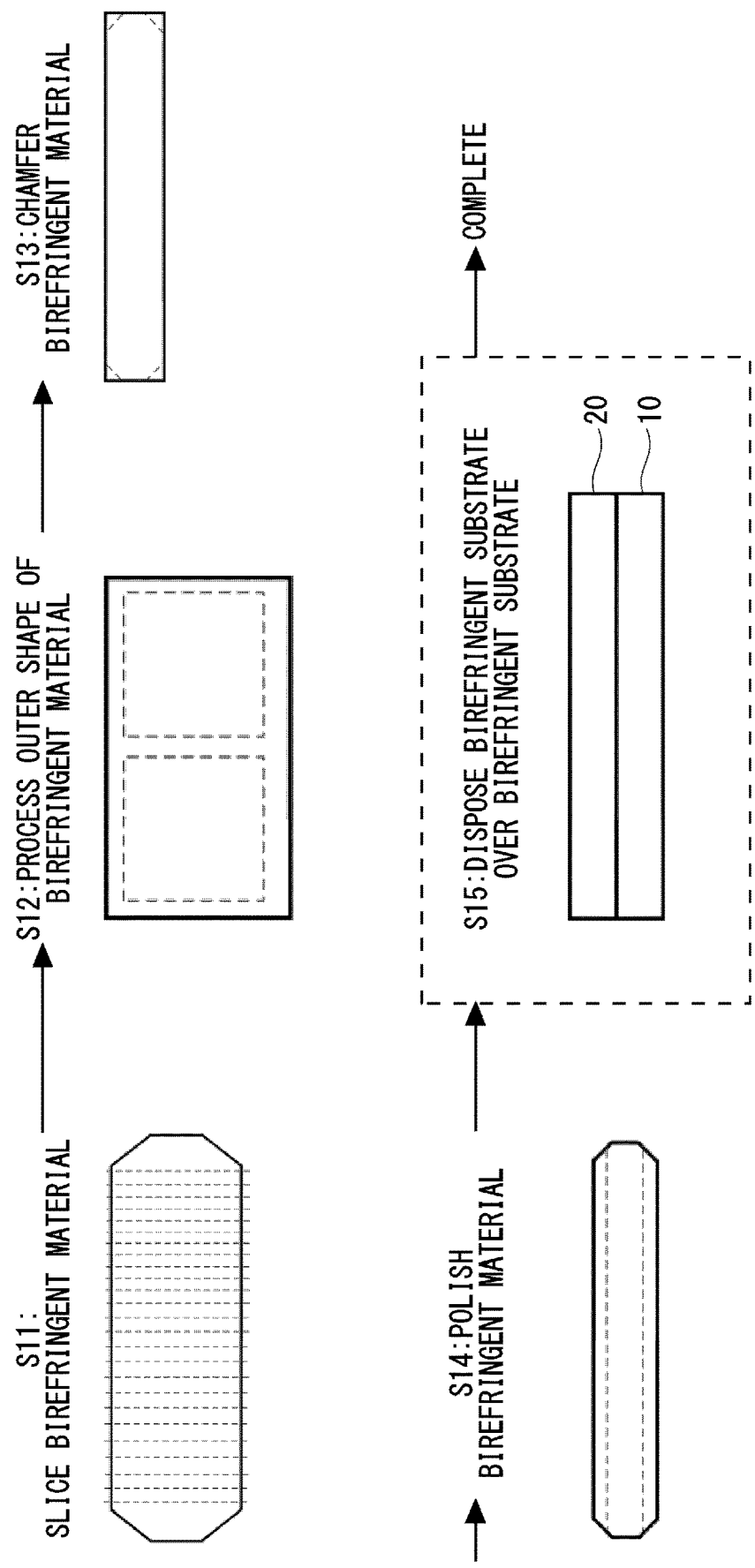
FIG. 14 is a process flowchart showing a method for manufacturing a wave plate according to a fifth embodiment.

Next, a method for manufacturing a wave plate according to a fifth embodiment will be described. FIG. 14 is a process flowchart showing an example of the method for manufacturing a wave plate according to the fifth embodiment. As shown in Step S11 of FIG. 14, the birefringent material is sliced. When the birefringent material is sliced, the birefringent material is sliced in such a way that the birefringent material includes an optical axis in a predetermined main surface and in a predetermined direction.

Next, as shown in Step S12, an outer shape of the sliced birefringent material is processed. For example, the outer shape of the birefringent material is processed so that the birefringent material has a plate shape. Next, as shown in Step S13, the birefringent material whose outer shape has been processed is chamfered. Then, as shown in Step S14, the birefringent material is polished. In this manner, a birefringent substrate having a predetermined thickness, a predetermined main surface, and an optical axis in a predetermined direction is formed.

Next, as shown in Step S15, the birefringent substrate 20 is disposed over the birefringent substrate 10. The birefringent substrate 20 is disposed over the birefringent substrate 10 in such a way that the main surfaces 11 and 21 become parallel to each other, and the optical axes 13 and 23 become orthogonal to each other. In the drawing, only the birefringent substrates 10 and 20 are shown, but the method for manufacturing a wave plate for other birefringent substrates 30 to J0 is the same as the above-described method for manufacturing a wave plate.

In Step S15, examples of the method for disposing the birefringent substrate 20 over the birefringent substrate 10 include: A. Bonding using an adhesive; B. Air gap method, C. Direct bonding without using an adhesive.

A. In the bonding using an adhesive, for example, the birefringent substrates 10 and 20 are bonded to each other with an adhesive. For example, the above-described wave plate 1 is manufactured by bonding at least either of, the birefringent substrates 10 and 20 or the birefringent substrates 20 and 30 with an adhesive.

An advantage of the bonding using an adhesive is that the birefringent substrates can be easily bonded to each other. Disadvantages of the bonding using an adhesive are that weatherability of an adhesive layer deteriorates, and that light is not transmitted in an ultraviolet range, because the adhesive layer is used. The adhesive used is, for example, an acrylic or epoxy optical adhesive.

Figure 15A:
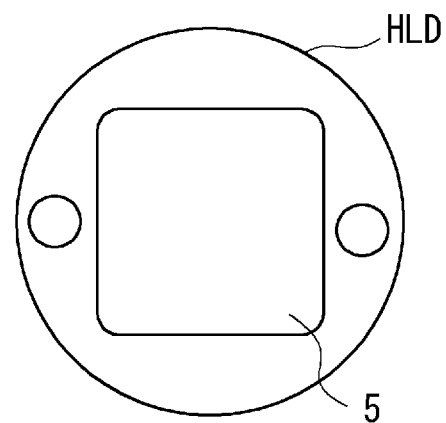
FIG. 15A is a top view showing an example of a holder for holding birefringent substrates used in the wave plate according to the fifth embodiment.
Figure 15B:
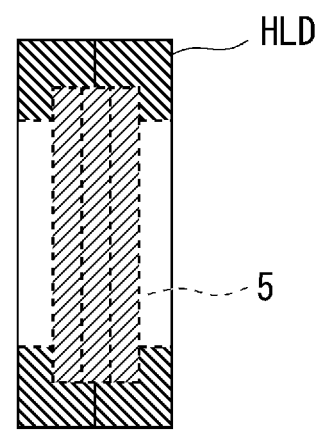
FIG. 15B is a cross-sectional view showing an example of the holder for holding the birefringent substrates used in the wave plate according to the fifth embodiment.

B. The air gap method is a method in which the birefringent substrates 10 and 20 used for the wave plate are held by a holder. In the case of the above-described wave plate 1, at least either of the birefringent substrates 10 and 20 or the birefringent substrates 20 and 30 are held by a holder with a space between the birefringent substrates. FIGS. 15A and 15B show an example of the holder for holding birefringent substrates used in the wave plate according to the fifth embodiment. FIG. 15A is a top view, and FIG. 15B is a cross-sectional view. As shown in FIGS. 15A and 15B, a holder HLD holds a plurality of birefringent substrates used for the wave plate 5.

An advantage of the air gap method is that it is excellent in weatherability, because an adhesive layer is not used. Another advantage of the air gap method is that when quartz, $MgF_2$, sapphire, etc. are used, a wave plate has a transmission range in the ultraviolet range, because an adhesive is not used. A disadvantage of the air gap method is that a space is required to assemble an apparatus, because, for example, it is necessary to hold the birefringent substrate using the holder HLD, and that, when the birefringent substrates are held with a space therebetween, it is difficult to adjust angles and an interface with air increases, thereby reducing the transmittance.

Figure 16:
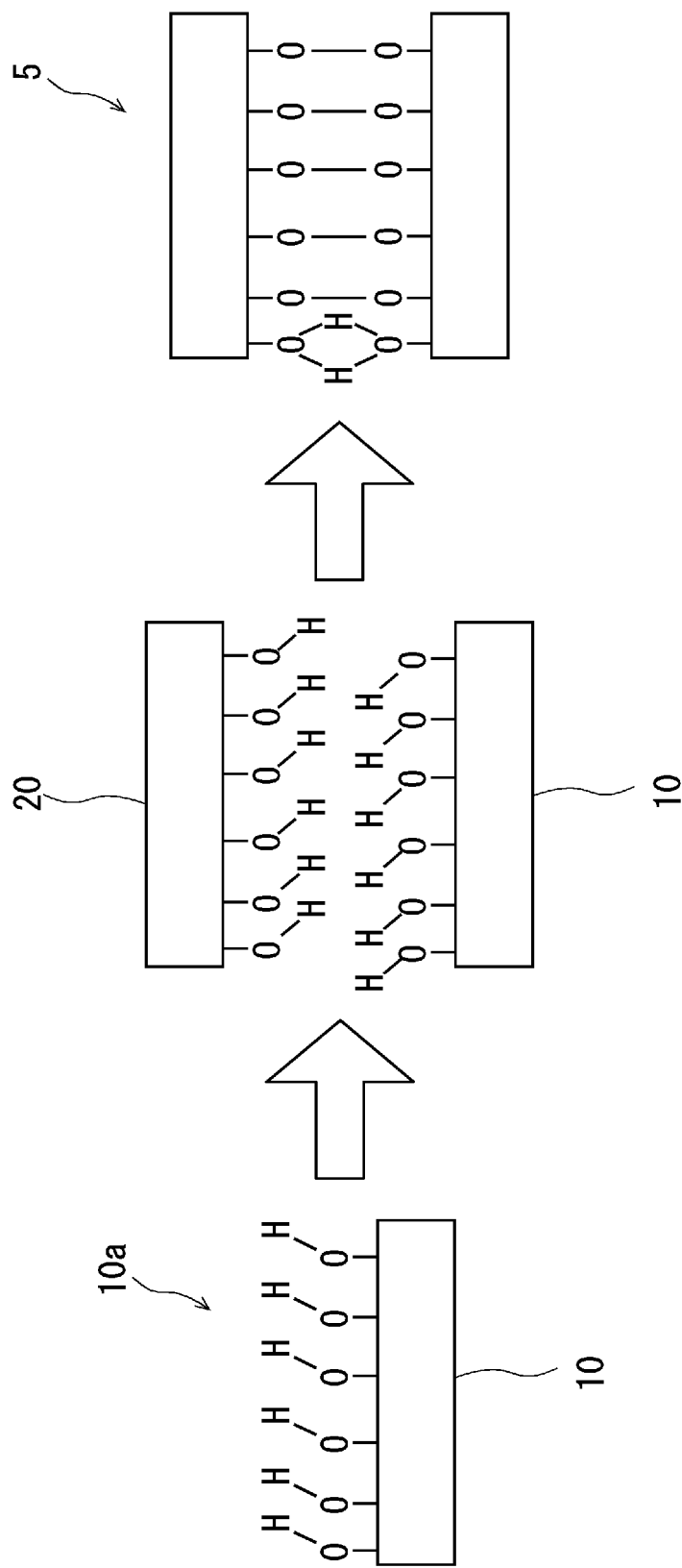
FIG. 16 shows an example of a method of direct bonding of birefringent substrates used in the wave plate according to the fifth embodiment.

C. In the direct bonding without using an adhesive, activated bonding surfaces are directly bonded. FIG. 16 shows an example of a method for directly bonding birefringent substrates used for the wave plate according to the fifth embodiment. As shown in FIG. 16, for example, a bonding surface 10a of the birefringent substrate 10 is activated by irradiation with ultraviolet light (173 nm), $O_2$ plasma, Ar ions, or the like. The bonding surface is, for example, a main surface. After that, the activated bonding surfaces 10a of the birefringent substrates 10 and 20 are directly bonded to each other.

When the substrates are bonded, conditions including a pressure of the atmosphere such as vacuum or atmospheric pressure, temperatures of the birefringent substrates 10 and 20 including a room temperature or a heating temperature, a pressure applied to pressurize the birefringent substrates, and a pressurizing position, are optimized. The pressurizing position may be, for example, a specific point, and the birefringent substrates 10 and 20 may be spontaneously bonded by pressurizing the specific point. In this manner, at least either of the birefringent substrates 10 and 20 or the birefringent substrates 20 and 30 are directly bonded to each other, so that the wave plate 5 can be manufactured.

An advantage of the direct bonding is that it is excellent in weatherability, because an adhesive layer is not used. Another advantage of the air gap method is that when quartz, $MgF_2$, sapphire, etc. are used, a wave plate has a transmission range in the ultraviolet range, because an adhesive is not used. Disadvantages of the direct bonding are that a high level of techniques are required to bond the substrates, and that the number of steps becomes greater than those of other bonding methods.

Sixth Embodiment

Next, a sixth embodiment will be described. This embodiment is an example in which a wave plate is applied to an optical apparatus. The optical apparatus is, for example, a liquid crystal projector or an optical pickup.

Figure 17:
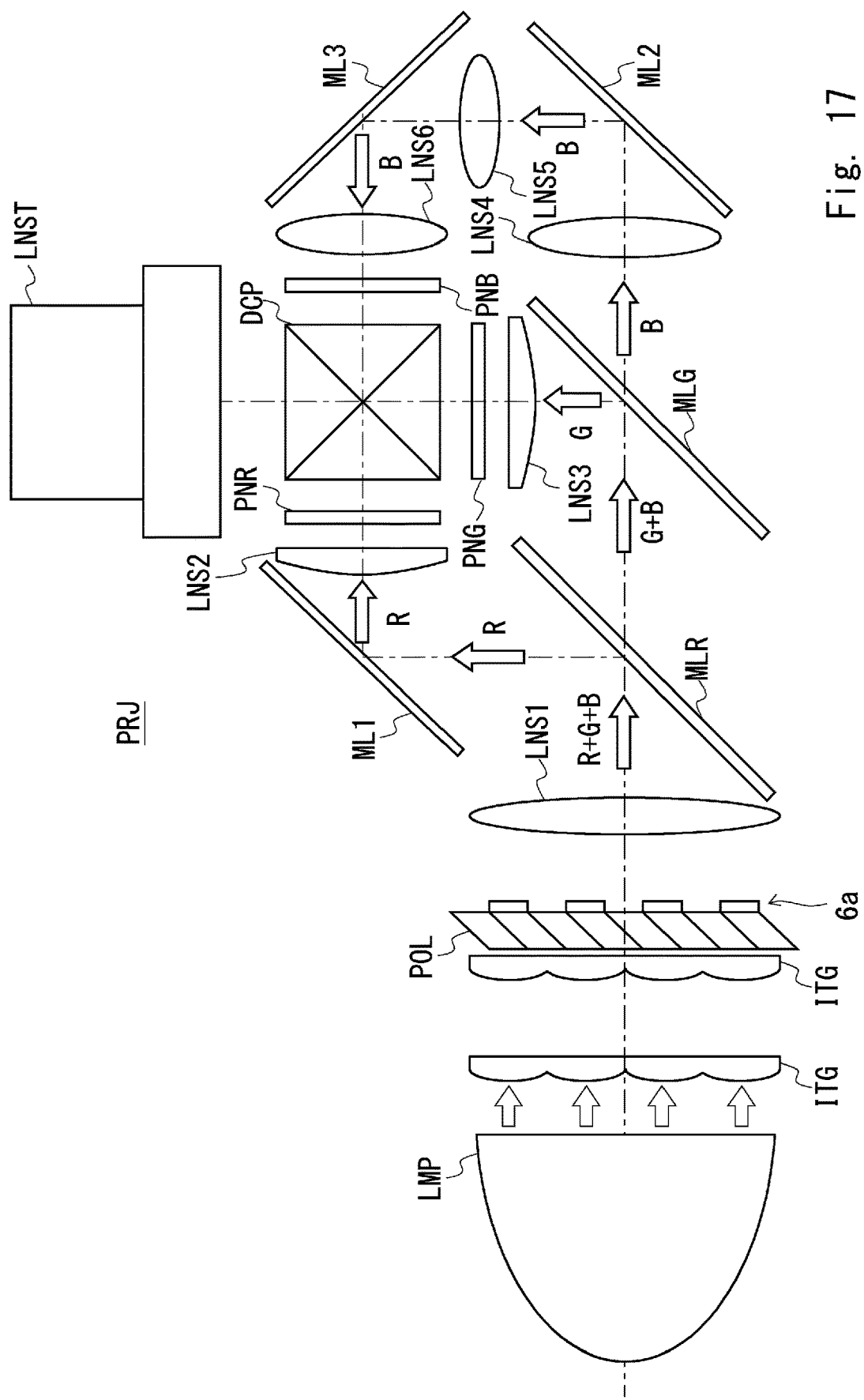
FIG. 17 shows an example of a liquid crystal projector as an optical apparatus including a wave plate according to a sixth embodiment.

FIG. 17 shows an example of a liquid crystal projector as an optical apparatus including a wave plate according to the sixth embodiment. As shown in FIG. 17, a liquid crystal projector PRJ includes a light source LMP, an integrator ITG, a polarization conversion element POL, a wave plate 6a, lenses LNS1 to LNS6, a reflection dichroic mirror MLR for R, a reflection dichroic mirror MLG for G, mirrors ML1 to ML3, a liquid crystal panel PNR for R, a liquid crystal panel PNG for G, a liquid crystal panel PNB for B, a cross dichroic prism DCP, and a projection lens LNST.

The light source LMP generates irradiation light. The irradiation light is, for example, white light, and includes red light R, green light G, and blue light B. The irradiation light generated by the light source LMP is condensed and made uniform via the integrator ITG, and is separated from random polarized light into linearly polarized light of P polarization and S polarization by the polarization conversion element POL. Then, the polarization state of the irradiation light is controlled by the wave plate 6a. For example, a polarization direction of the irradiation light is rotated by 90[°] by the wave plate 6a with the function of a λ/2 wave plate. By doing so, the polarization state of the irradiation light is set to a specific linear direction.

The irradiation light transmitted through the wave plate 6a is condensed by the lens LNS1, and enters the reflection dichroic mirror MLR for R. The reflection dichroic mirror MLR for R reflects red light R and transmits green light G and blue light B of the irradiation light.

The red light R reflected by the reflection dichroic mirror MLR for R is reflected by the mirror ML1, and enters the liquid crystal panel PNR for R via LNS2. The liquid crystal panel PNR for R outputs the red light R whose polarization state has been changed by the wave plate 6a based on image information. Thus, the red light R output from the liquid crystal panel PNR for R includes the image information. The red light R output from the liquid crystal panel PNR for R enters a side surface of the cross dichroic prism DCP.

The green light G transmitted through the reflection dichroic mirror MLR for R is reflected by the reflection dichroic mirror MLG for G, and enters the liquid crystal panel PNG for G via LNS3. The liquid crystal panel PNG for G outputs the green light G whose polarization state has been changed by the wave plate 6a based on the image information. Then, the green light G including the image information by the liquid crystal panel PNG for G enters another side surface of the cross dichroic prism DCP.

The blue light B transmitted through the reflection dichroic mirror MLR for R transmits through the reflection dichroic mirror MLG for G. Then, the blue light B enters the liquid crystal panel PNB for B via the mirrors ML2 to ML3 and the lenses LNS4 to LNS6 in a predetermined order. The liquid crystal panel PNB for B outputs the blue light B whose polarization state has been changed by the wave plate 6a based on the image information. The blue light B including the image information by the B liquid crystal panel PNB enters another side surface of the cross dichroic prism DCP.

The cross dichroic prism DCP combines the red light R output from the liquid crystal panel PNR for R, the green light G output from the liquid crystal panel PNG for G, and the blue light B output from the liquid crystal panel PNB for B and emits the combined light to the projection lens LNST. In this manner, the liquid crystal projector PRJ can project a color image including red light, green light, and blue light.

Figure 18:
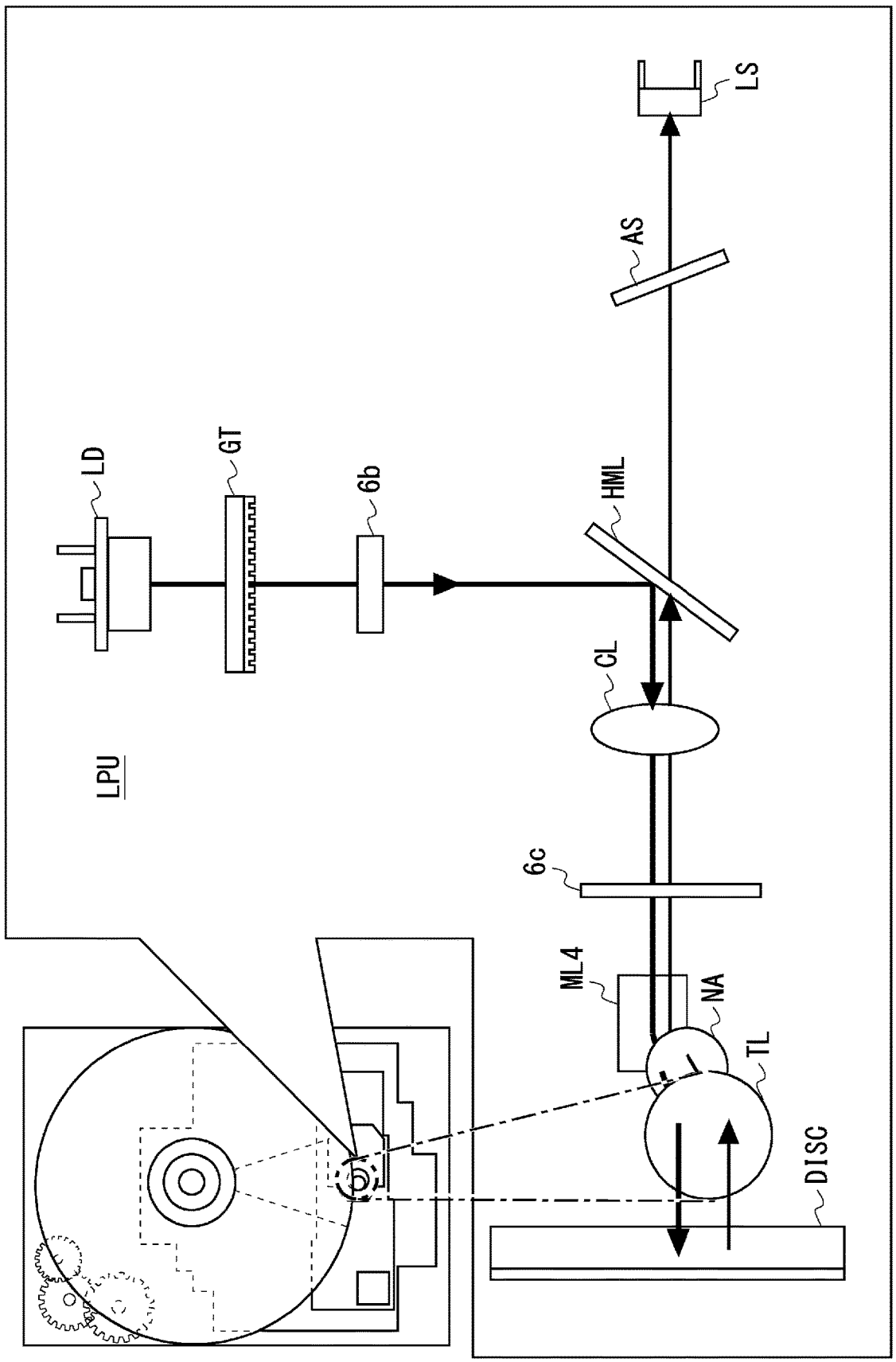
FIG. 18 shows an example of an optical pickup as an optical apparatus using the wave plate according to the sixth embodiment.

FIG. 18 shows an example of the optical pickup as an optical apparatus using the wave plate according to the sixth embodiment. As shown in FIG. 18, the optical pickup LPU includes a laser diode LD, a grating GT, a λ/2 wave plate 6b, a half mirror HML, a collimator lens CL, a λ/4 wave plate 6c, a mirror ML4, an aperture control element NA, an objective lens TL, and an optical sensor LS. The optical pickup LPU reads groove information formed over a disc DISC surface such as a DVD and a hard disk.

The laser diode LD generates laser light as a light source. A wavelength of laser light emitted from the laser diode LD is selected by the grating GT, and the laser light is converted into linearly polarized light having a uniform plane of polarization via the λ/2 wave plate 6b. A Part of the laser light including linearly polarized light is reflected by the half mirror HML, and is converted into parallel light by the collimator lens CL. The laser light converted into parallel light is converted into circularly polarized light by the λ/4 wave plate 6c, and is condensed on the DISC surface by the objective lens TL via the mirror ML4 and the aperture control element NA.

The laser light condensed over the DISC surface is reflected to the DISC surface. At that time, the reflected light includes the groove information over the DISC surface. As described above, the objective lens TL focuses the laser light whose polarization state has been changed by the wave plates 6b and 6c over the disk DISC surface in which grooves are formed, and also condenses reflected light that is laser light reflected to the disk DISC surface.

The reflected light including the groove information condensed by the objective lens TL is converted into linearly polarized light by the λ/4 wave plate 6c via the aperture control element NA and the mirror ML4. Then, the linearly polarized light transmits through the half mirror HML, and aberration is corrected by the correction plate AS. Then, the reflected light is detected by the optical sensor LS. In this manner, the optical pickup LPU can read the groove information formed in the disk DISC surface.

Each of optical apparatuses such as the liquid crystal projector PRJ and the optical pickup LPU according to this embodiment includes the wave plates 6a to 6c. The wave plates 6a to 6c can correct the influence of a deviation in the incident angle. Thus, even when the irradiation light and the laser light converge in a conical form, and a deviation occurs from the vertical incidence, it is possible to correct the influence of the deviation in the incident angle. In this way, the variation in the phase difference and the loss of the light amount can be reduced.

Further, when an inorganic material is used, it is possible to cope with an increase in output of irradiation light and laser light. Components and effects other than those described above are included in the descriptions of the first to fifth embodiments.

Although the disclosure made by the inventor has been specifically described based on the embodiments, the present disclosure is not limited to the above embodiments, and various modifications can be made without departing from the scope of the present disclosure, as a matter of course.

The first to sixth embodiments can be combined as desirable by one of ordinary skill in the art.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A wave plate comprising: a first birefringent substrate including a first main surface and an optical axis in a first direction; a second birefringent substrate disposed over the first birefringent substrate and including a second main surface and an optical axis in a second direction; and a third birefringent substrate disposed over the second birefringent substrate and including a third main surface and an optical axis in a third direction, wherein the first birefringent substrate and the second birefringent substrate are made of the same birefringent material, the first main surface, the second main surface, and the third main surface are disposed in parallel to one another, the first direction and the second direction are parallel to the first main surface and the second main surface, the first direction and the second direction are orthogonal to each other, and the third direction is orthogonal to the third main surface, and the third direction is orthogonal to the first direction and the second direction.

2. The wave plate according to claim 1, wherein incident light that enters the third main surface and is linearly polarized in one direction parallel to the third main surface is emitted from the first birefringent substrate as circularly polarized light.

3. The wave plate according to claim 1, wherein
at least either of the first and second birefringent substrates or the second and third birefringent substrates are bonded to each other with an adhesive.

4. The wave plate according to claim 1, wherein
at least either of the first and second birefringent substrates or the second and third birefringent substrates are held by a holder with a space therebetween.

5. The wave plate according to claim 1, wherein
at least either of the first and second birefringent substrates or the second and third birefringent substrates are directly bonded to each other.

6. The wave plate according to claim 1, wherein incident light that enters the first main surface and is linearly polarized in one direction parallel to the first main surface is emitted from the third birefringent substrate as linearly polarized light in another direction parallel to the first main surface and orthogonal to the one direction.

7. The wave plate according to claim 6, wherein
an angle formed by the one direction and the first direction is equal to an angle formed by the one direction and the second direction.

8. The wave plate according to claim 7, wherein
the birefringent material of the first birefringent substrate and the second birefringent substrate differs from the birefringent material of the third birefringent substrate.

9. The wave plate according to claim 6, wherein
the third birefringent substrate includes an optical rotation property, and
an angle formed by the one direction and the first direction differs from an angle formed by the one direction and the second direction.

10. The wave plate according to claim 9, wherein the birefringent material of the first birefringent substrate and the second birefringent substrate includes the same birefringent material as that of the third birefringent substrate.

* * * * *